(12) United States Patent
Yoshioka et al.

(10) Patent No.: US 12,309,748 B2
(45) Date of Patent: May 20, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 638 days.

(21) Appl. No.: 17/595,885

(22) PCT Filed: Jun. 3, 2019

(86) PCT No.: PCT/JP2019/022060
§ 371 (c)(1),
(2) Date: Nov. 29, 2021

(87) PCT Pub. No.: WO2020/245896
PCT Pub. Date: Dec. 10, 2020

(65) Prior Publication Data
US 2022/0232520 A1    Jul. 21, 2022

(51) Int. Cl.
*H04W 72/02* (2009.01)
*H04W 72/0446* (2023.01)
*H04W 72/0453* (2023.01)
*H04W 72/20* (2023.01)
*H04W 92/18* (2009.01)

(52) U.S. Cl.
CPC ....... *H04W 72/02* (2013.01); *H04W 72/0446* (2013.01); *H04W 72/0453* (2013.01); *H04W 72/20* (2023.01); *H04W 92/18* (2013.01)

(58) Field of Classification Search
CPC . H04W 72/02; H04W 72/20; H04W 72/0446; H04W 72/0453; H04W 92/18
See application file for complete search history.

(56) References Cited

U.S. PATENT DOCUMENTS

| | | | |
|---|---|---|---|
| 2020/0205165 A1* | 6/2020 | Huang | H04L 1/1854 |
| 2022/0053490 A1* | 2/2022 | Zhang | H04W 72/0446 |

OTHER PUBLICATIONS

Spreadtrum Communications; "Discussion on physical layer procedures for sidelink"; 3GPP Tsg Ran WG1 #97, R1-1906362; Reno, USA; May 13-17, 2019 (8 pages).

(Continued)

*Primary Examiner* — Rhonda L Murphy
(74) *Attorney, Agent, or Firm* — Osha Bergman Watanabe & Burton LLP

(57) ABSTRACT

A terminal includes a receiving unit that performs reception on at least one of a plurality of sidelink control channels or a plurality of sidelink shared channels; a control unit that selects, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the feedback channels is associated with at least one of a control channel of the plurality of sidelink control channels or a shared channel of the plurality of sidelink shared channel; and a transmitting unit that performs simultaneous transmissions on the selected upper limit number of sidelink feedback channels.

4 Claims, 20 Drawing Sheets

(56) References Cited

OTHER PUBLICATIONS

Office Action issued in Japanese Application No. 2021-524527 dated Apr. 18, 2023 (5 pages).
International Search Report issued in PCT/JP2019/022060 on Dec. 17, 2019 (3 pages).
Written Opinion of the International Searching Authority issued in PCT/JP2019/022060 on Dec. 17, 2019 (3 bages).
Bgpp Ts 38.214 V15.5.0; "3rd Generation Partnership Project; Technical Specification Group Radio Access Network; NR; Physical layer procedures for data (Release 15)"; Mar. 2019 (103 pages).
Extended European Search Report issued in counterpart European Patent Application No. 19931729.8, mailed on Nov. 25, 2022 (9 pages).
LG Electronics; "Discussion on physical layer procedures for NR sidelink"; 3GPP Tsg Ran WG1 Meeting #97, R1-1907018; Reno, USA; May 13-17, 2019 (11 pages).
Samsung; "Discussion on Physical Layer Procedures"; 3GPP Tsg Ran WG1 Meeting #95, R1-1812985; Spokane, USA; Nov. 12-16, 2018 (6 pages).

\* cited by examiner

SELECT RADIO RESOURCE FROM SYNCHRONIZED COMMON TIME/FREQUENCY GRID

TERMINAL AND COMMUNICATION METHOD

TECHNICAL FIELD

The present invention relates to a terminal and a communication method in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which terminals, such as a user equipment (UE), perform communication directly with each other without going through a base station.

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.214 V15.5.0 (2019-03)

SUMMARY OF THE INVENTION

Problem to be Solved by the Invention

When a terminal simultaneously transmits multiple HARQ-ACKs via multiple PSFCHs, if the multiple resources of the multiple PSFCHs are non-contiguous in a frequency domain, the transmission capability of the terminal may decrease. In a case where multiple resources of multiple PSFCHs are non-contiguous in the frequency domain, the interference on other frequency bands tends to increase. Accordingly, in a case where multiple non-contiguous resources in the frequency domain are used, Maximum Power Reduction (MPR) may be set to a large value.

There is a need for a technique to suppress degradation in transmission capability of a terminal in a case where the terminal performs simultaneous transmissions on multiple PSFCHs.

Means for Solving the Problem

According to an aspect of the present invention, there is provided a terminal including a receiving unit that performs reception on at least one of a plurality of sidelink control channels or a plurality of sidelink shared channels; a control unit that selects, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the feedback channels is associated with at least one of a control channel of the plurality of sidelink control channels or a shared channel of the plurality of sidelink shared channel; and a transmitting unit that performs simultaneous transmissions on the selected upper limit number of sidelink feedback channels.

Advantage of the Invention

According to an embodiment, it is possible to suppress degradation in transmission capability of a terminal in a case where the terminal performs simultaneous transmissions on multiple PSFCHs.

BRIEF DESCRIPTION OF DRAWINGS

FIG. 8B is a diagram illustrating an outline of SL transmission mode 2a.

EMBODIMENTS OF THE INVENTION

In the following, embodiments of the present invention are described with reference to the appended drawings. The embodiments described below are merely an example, and embodiments to which the present invention is applied are not limited to the following embodiments.

In the embodiments, it is assumed that a direct communication scheme between terminals is LTE sidelink (SL) or NR SL, but the direct communication method is not limited to this method. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signals (PSS/SSS/PSSS/SSSS) used for synchronization.

For example, in UL, a reference signal of an antenna port X_ANT is used as the reference signal to be referred to so as to determine the path loss in the transmission power control, and in SL (including UL used as SL), a reference signal of an antenna port Y_ANT is used as the reference signal to be referred to so as to determine the path loss in the transmission power control.

Furthermore, in the embodiments, a configuration in which a terminal is installed in a vehicle is mainly assumed, but an embodiment of the present invention is not limited to this configuration. For example, a terminal may be a terminal carried by a person, a terminal may be a drone or a device installed in an aircraft, and a terminal may be a base station, an RSU, a relay station (relay node), a user equipment provided with scheduling capability, or the like.

(Overview of Sidelink)

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in NR. A sidelink communication may be defined to be a direct communication performed among two or more neighboring units of user equipment by using E-UTRA technology, without going through a network node. A sidelink may be defined to be an interface between units of user equipment in a sidelink communication.

Figure 1:
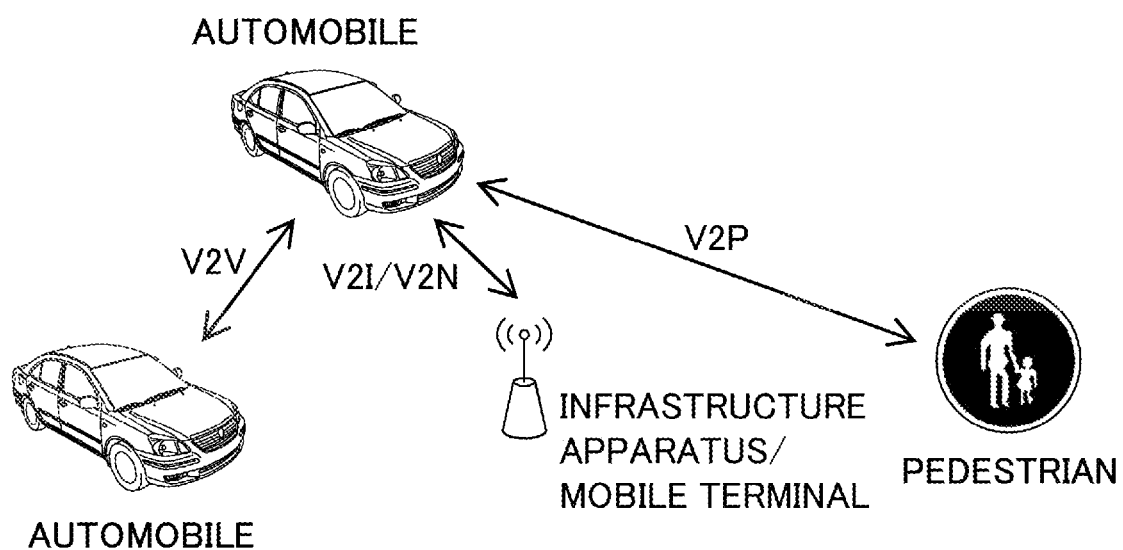
FIG. 1 is a diagram for illustrating V2X.
Figure 2A:
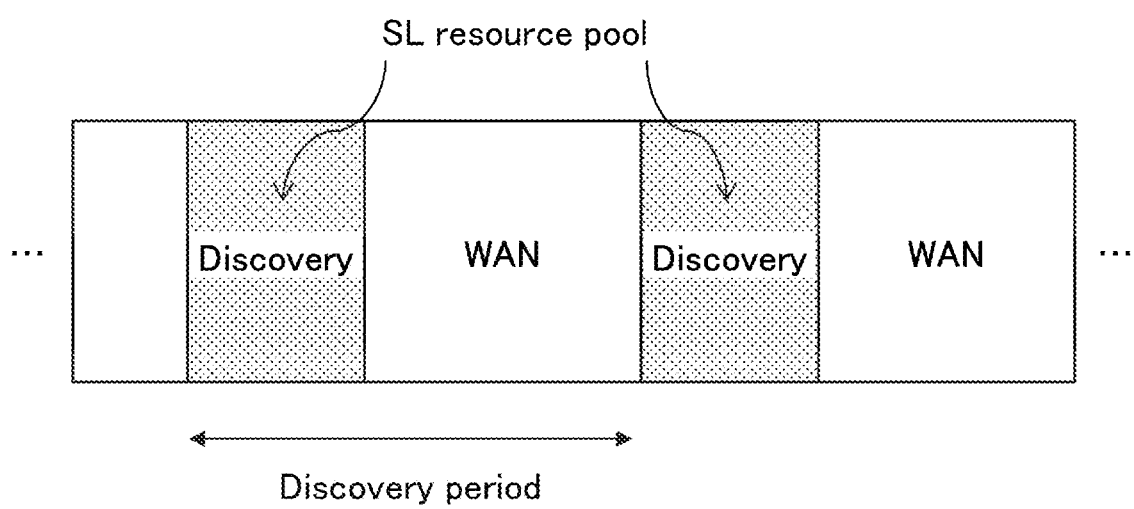
FIG. 2A is a diagram for illustrating sidelink.

Sidelink is roughly divided into "discovery" and "communication." For "discovery," as illustrated in FIG. 2A, a discovery message resource pool is configured for each discovery period, and a terminal (referred to as a UE) transmits a discovery message (discovery signal) within the resource pool. More specifically, there are Type 1 and Type 2b. In Type 1, a terminal autonomously selects a transmission resource from the resource pool. In Type 2b, a quasi-static resource is allocated by higher layer signaling (for example, an RRC signal).

Figure 2B:
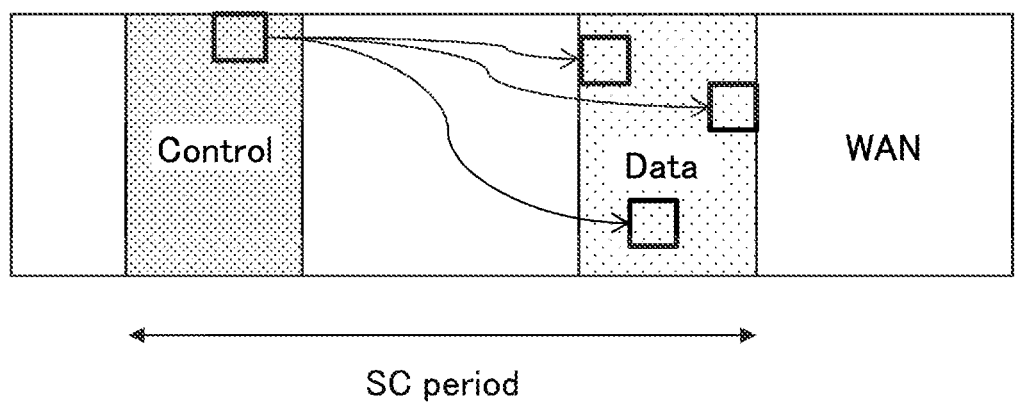
FIG. 2B is a diagram for illustrating sidelink.

For "communication," as illustrated in FIG. 2B, a sidelink control information (SCI)/data transmission resource pool is periodically configured for each Sidelink Control (SC) period. A terminal on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a terminal. In the mode 2, a terminal autonomously selects a transmission resource from the resource pool. For example, the resource pool is provided by notification through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted. In this specification, a PSCCH may be referred to as a sidelink control channel, and a PSSCH may be referred to as a sidelink shared channel. A signal transmitted through a PSCCH may be referred to as a sidelink control signal, and a signal transmitted through a PSSCH may be referred to as a sidelink data signal.

Figure 3:
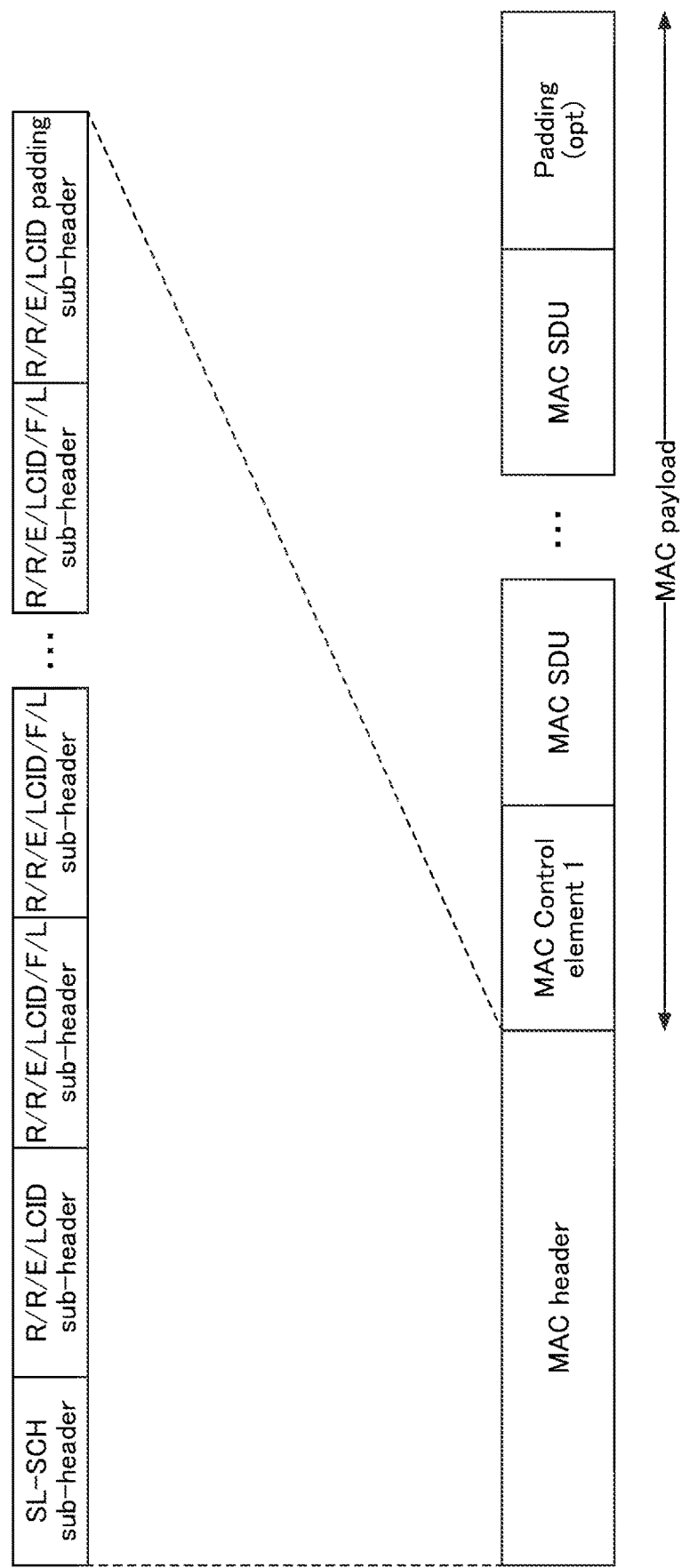
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
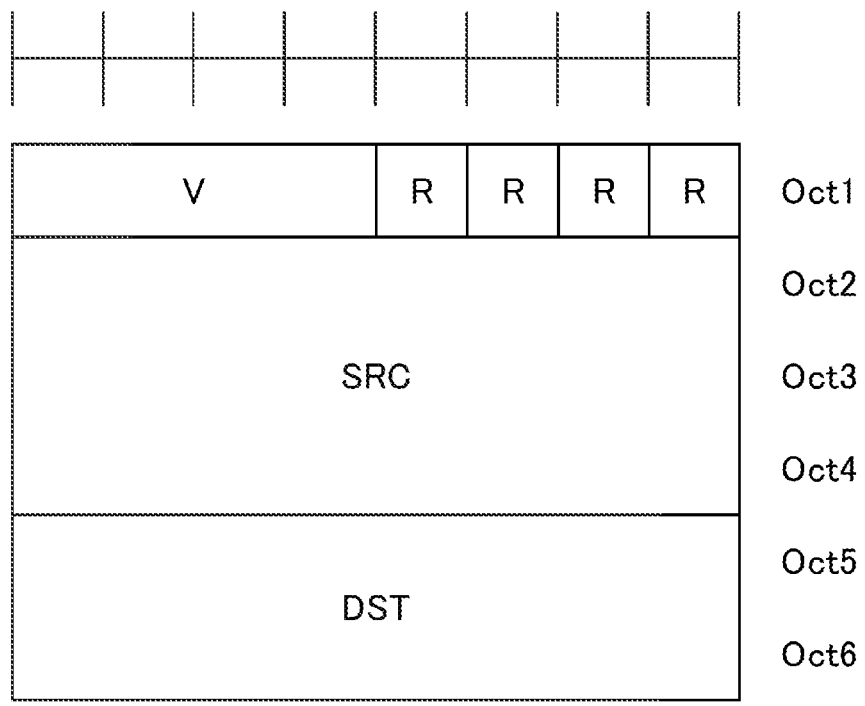
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the terminal. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
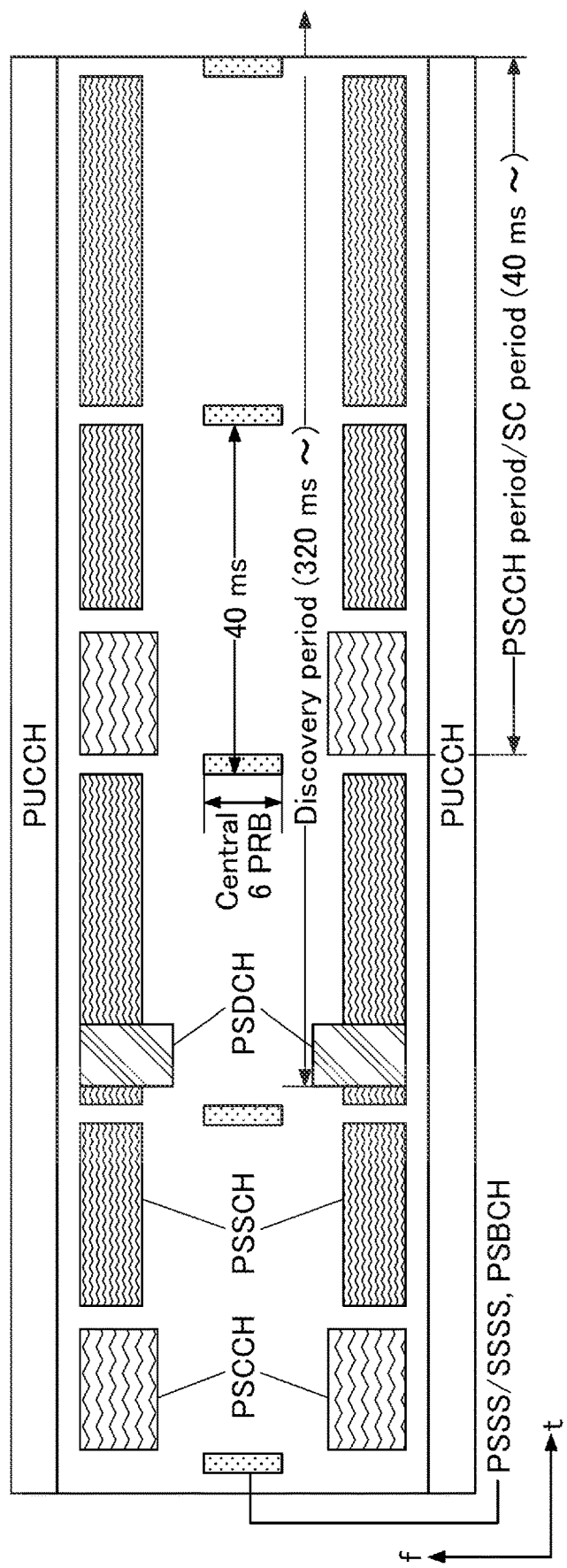
FIG. 5 is a diagram for illustrating an example of a channel structure used in LTE-V2X sidelink.

An example of a channel structure of LTE-V2X sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication." Note that the PSDCH need not be included for NR-V2X.

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a method related to "communication." However, in the embodiments, there may be no distinction between "communication" and "discovery." Furthermore, the technology according to the embodiments may be applied in "discovery."

(System Configuration)

Figure 6:
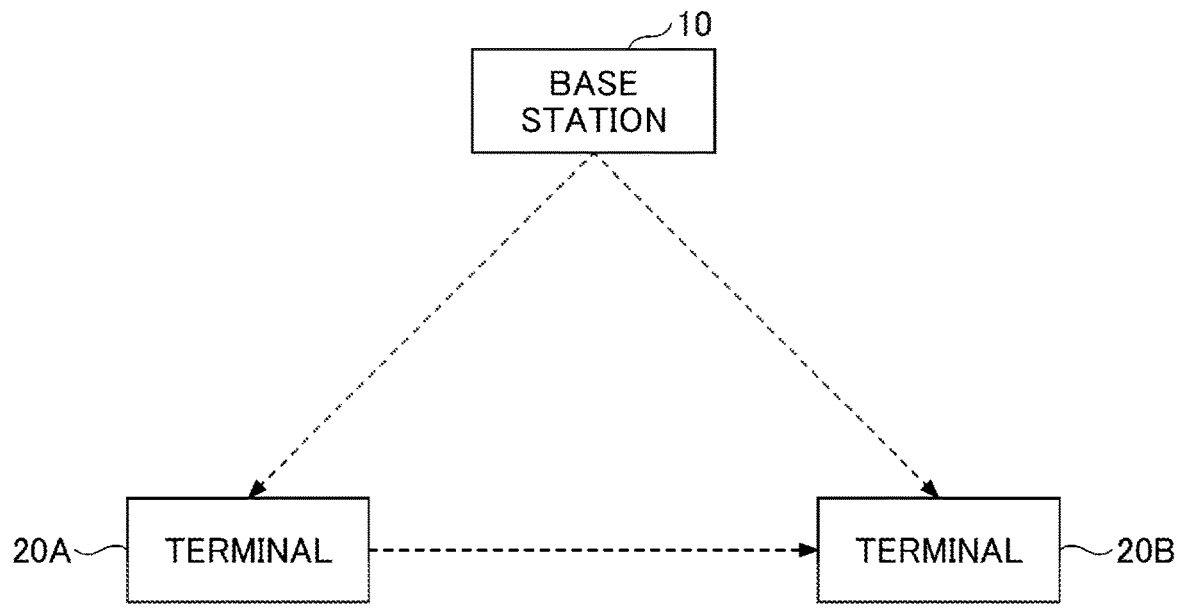
FIG. 6 is a diagram indicating an example of a configuration of a radio communication system according to an embodiment.

FIG. 6 is a diagram illustrating a configuration example of a radio communication system according to the embodiments. As illustrated in FIG. 6, the radio communication system according to the embodiments includes a base station 10, a terminal 20A, and a terminal 20B. Note that, actually, there may be many terminals, but FIG. 6 illustrates the terminal 20A and the terminal 20B as an example.

In FIG. 6, it is intended that the terminal 20A is the transmission side, the terminal 20B is the reception side, but both the terminal 20A and the terminal 20B have both the transmission function and the reception function. Hereinafter, when it is not necessary to particularly distinguish the terminals 20A and 20B, they are referred to simply as a "terminal 20" or a "terminal." FIG. 6 illustrates a case in which the terminal 20A and the terminal 20B are both in the coverage as an example, but an operation according to the embodiments can be applied to a case in which all the terminals 20 are within the coverage, a case in which some terminals 20 are within the coverage whereas the other terminals 20 are outside the coverage, and a case in which all the terminals 20 are outside the coverage.

In the embodiments, the terminal 20 is a device installed in a vehicle such as, for example, an automobile and has a cellular communication function as a UE in LTE or NR and a sidelink function. Furthermore, the terminal 20 has a function of acquiring report information (position, event information, or the like) as in a GPS device, a camera, or various types of sensors. Furthermore, the terminal 20 may be a general mobile terminal (such as a smartphone). Furthermore, the terminal 20 may be an RSU. The RSU may be a UE type RSU having a function of a UE, a BS type RSU (which is also referred to as a gNB type UE) having a function of a base station, or a relay station.

The terminal 20 need not be a device of one housing, and for example, even when various types of sensors are distributed and arranged in a vehicle, a device including various types of sensors is the terminal 20. Furthermore, the terminal 20 may have a function of performing transmission and reception of data with various types of sensors without including various types of sensors.

Furthermore, processing of sidelink transmission of the terminal 20 is basically the same as processing of UL transmission in LTE or NR. For example, the terminal 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the terminal 20 in the embodiments. Furthermore, the base station 10 may be an RSU (a gNB type RSU), a relay station, or a terminal provided with a scheduling function.

Furthermore, in the radio communication system according to the embodiments, a signal waveform used for SL or UL by the terminal 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the terminal 20 can operate in any mode among a mode 1 which is a mode in which resources are dynamically allocated by the ((enhanced) physical downlink control channel ((E) PDCCH) transmitted from the base station 10 to the terminal, a mode 2 which is a mode in which the terminal autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the terminal 20 from the base station 10.

Figure 7:
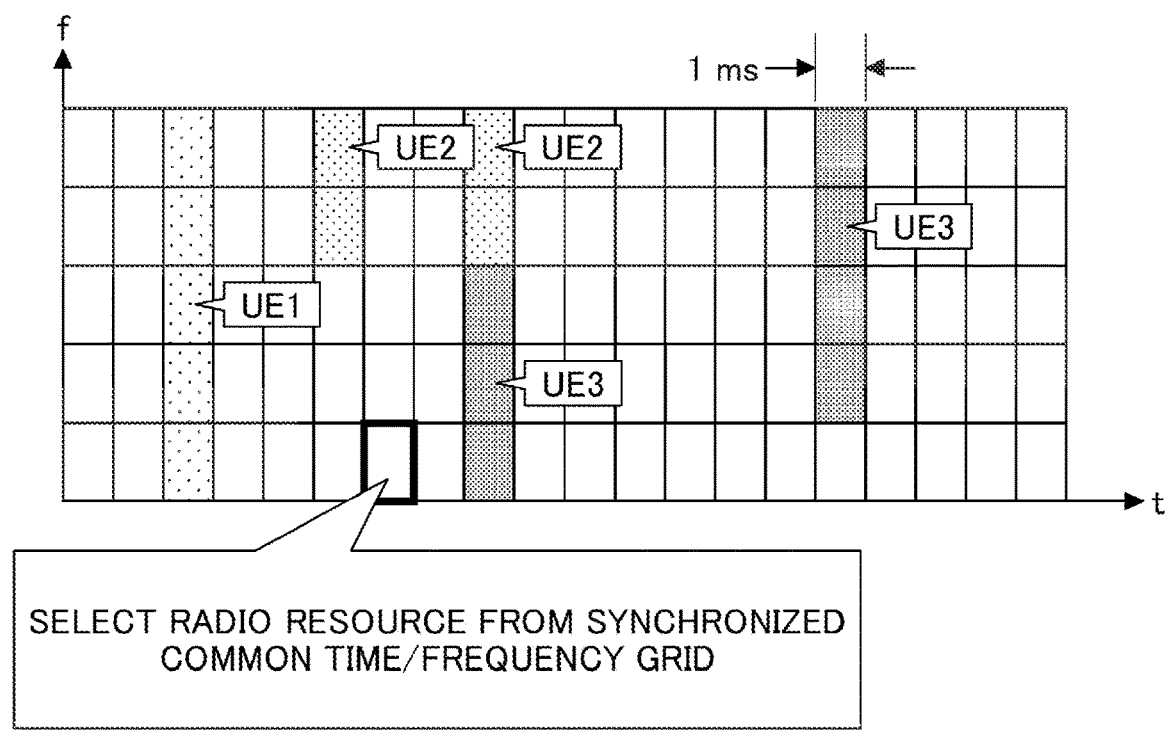
FIG. 7 is a diagram for illustrating a resource selection operation of a terminal.

As illustrated in FIG. 7, the terminal of the mode 4 (indicated by a UE in FIG. 7) selects a radio resource from a synchronized common time/frequency grid. For example, the terminal 20 performs sensing in the background, specifies resources which have a good sensing result and are not reserved for other terminals as candidate resources, and selects a resource to be used for transmission from the candidate resources.

(Overview of NR V2X)

In NR V2X, transmission modes are specified that are the same as SL transmission mode 3 and SL transmission mode 4 that are specified in LTE V2X.

In the following, an outline of transmission modes defined by NR V2X is described with reference to FIG. 8A to FIG. 8D.

Figure 8A:
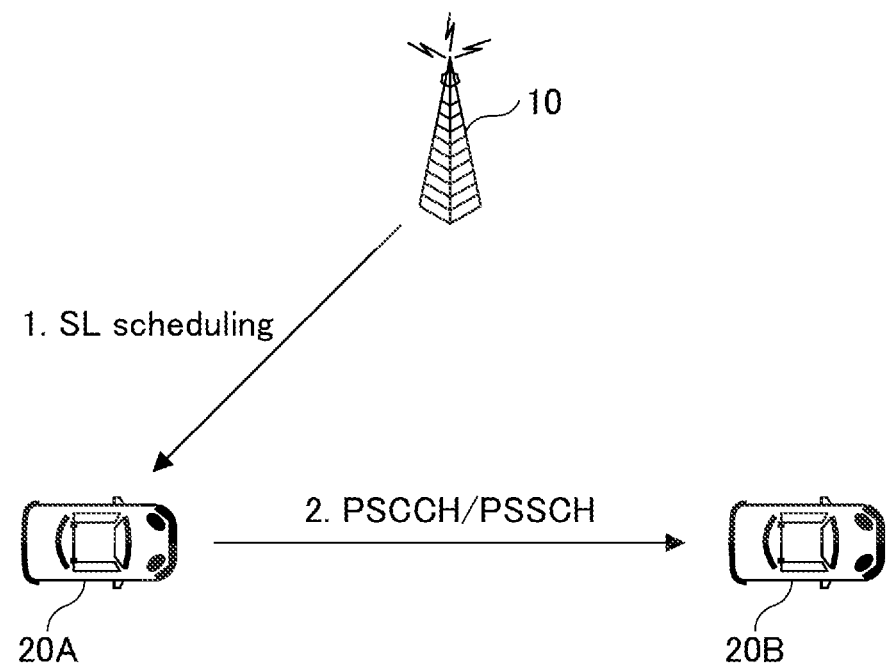
FIG. 8A is a diagram illustrating an outline of SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and assigns the transmission resource to the transmitting terminal 20A. The terminal 20A transmits a signal to the receiving terminal 20B by using the assigned transmission resource.

Figure 8B:
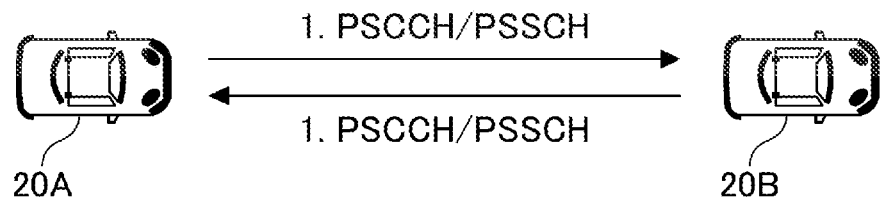
Figure 8C:
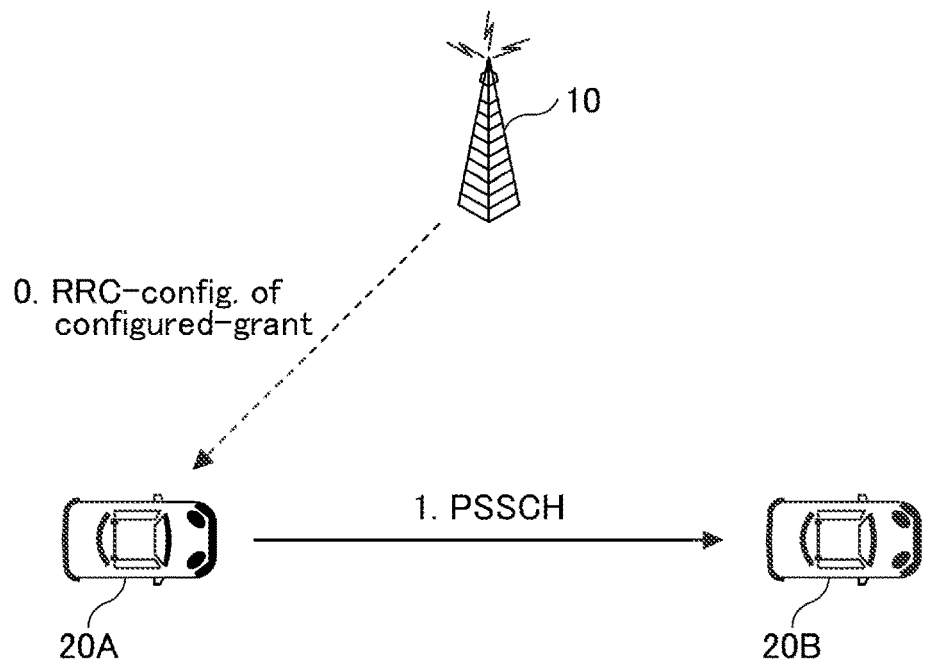
FIG. 8C is a diagram illustrating an outline of SL transmission mode 2c.
Figure 8D:
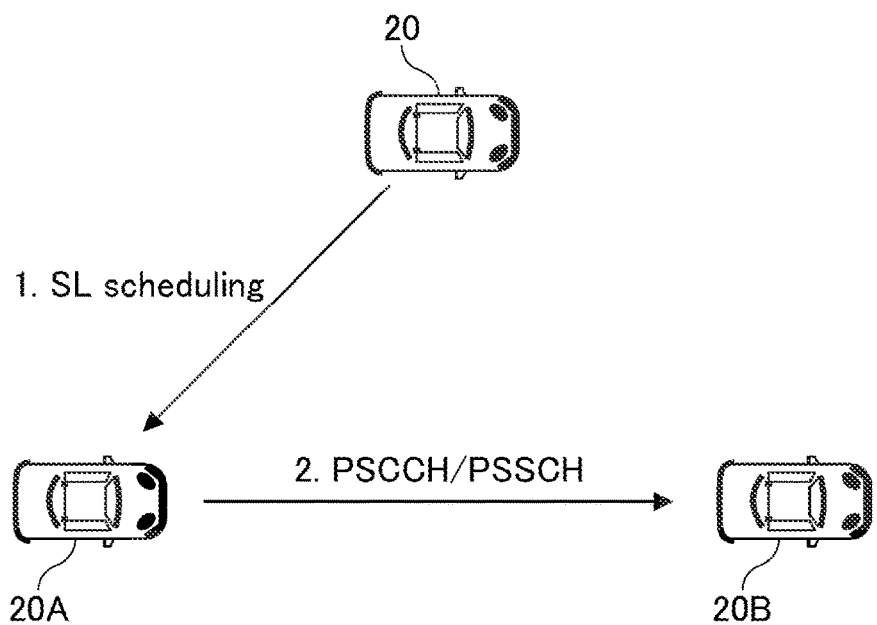
FIG. 8D is a diagram illustrating an outline of SL transmission mode 2d.

FIG. 8B, FIG. 8C, and FIG. 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting terminal 20A autonomously selects a transmission resource and transmits a signal to the receiving terminal 20B by using the selected transmission resource.

FIG. 8C is a diagram illustrating an outline of SL transmission mode 2c. In the SL transmission mode 2c, for example, the base station 10 preconfigures transmitting resources with a certain period to the terminal 20A, and the terminal 20A transmits a signal to the receiving terminal 20B by using the transmitting resources with the predetermined period. Here, instead of the base station 10 preconfiguring the transmitting resources with the certain period to the terminal 20A, for example, the transmitting resources with the certain period may be configured to the terminal 20A according to a specification.

FIG. 8D is a diagram illustrating an overview of SL transmission mode 2d. In SL transmission mode 2d, for example, the terminal 20 performs an operation that is the same as an operation of the base station 10. Specifically, the terminal 20 schedules transmission resources and assigns the transmission resources to the transmitting terminal 20A. The terminal 20A may perform a transmission to a receiving terminal 20B by using the assigned communication resources. Namely, the terminal 20 may control a transmission by another terminal 20.

Figure 9A:
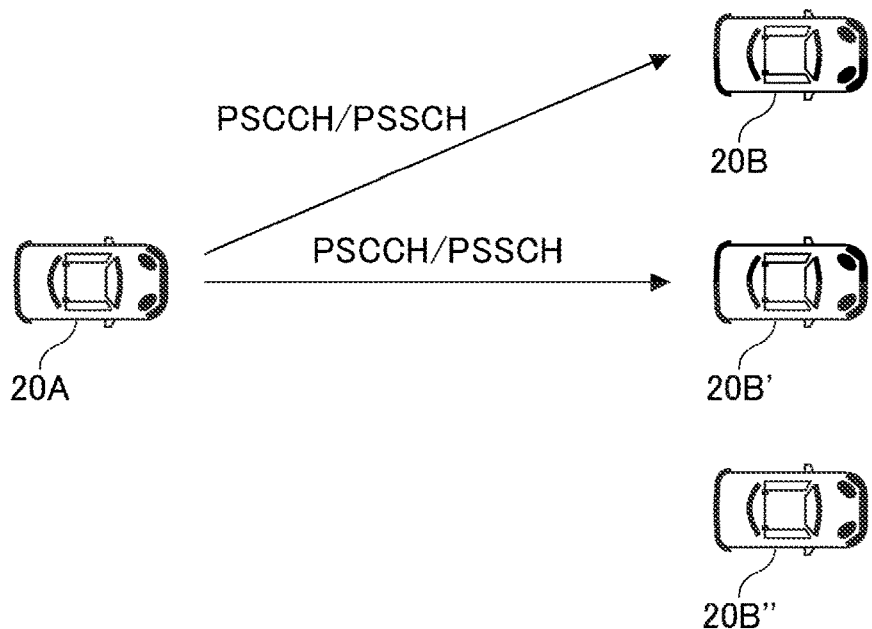
FIG. 9A is a diagram illustrating an example of a unicast PSCCH/PSSCH transmission.
Figure 9B:
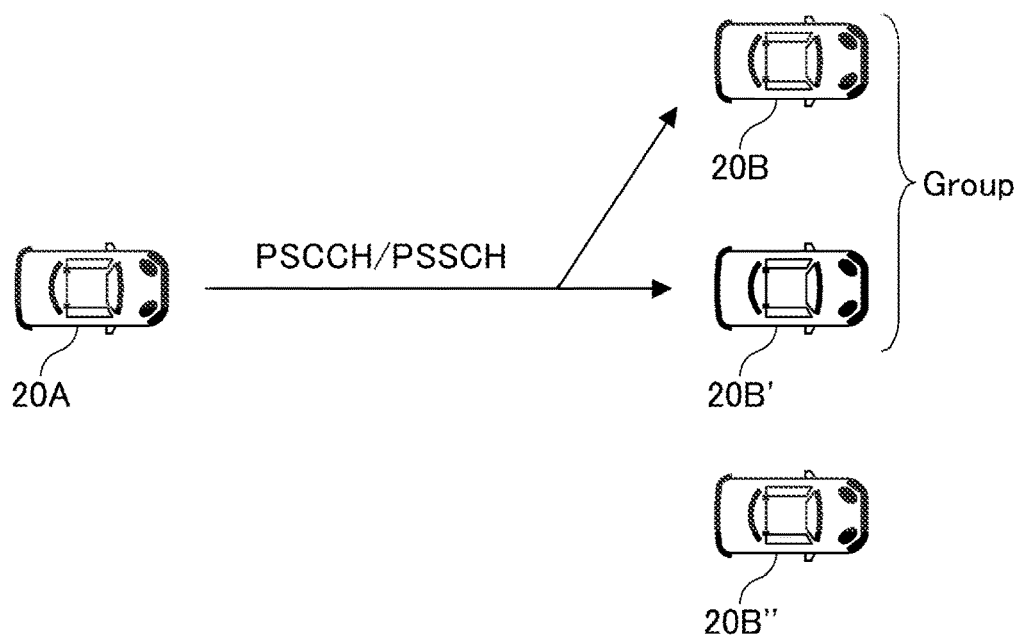
FIG. 9B is a diagram illustrating an example of a groupcast PSCCH/PSSCH transmission.
Figure 9C:
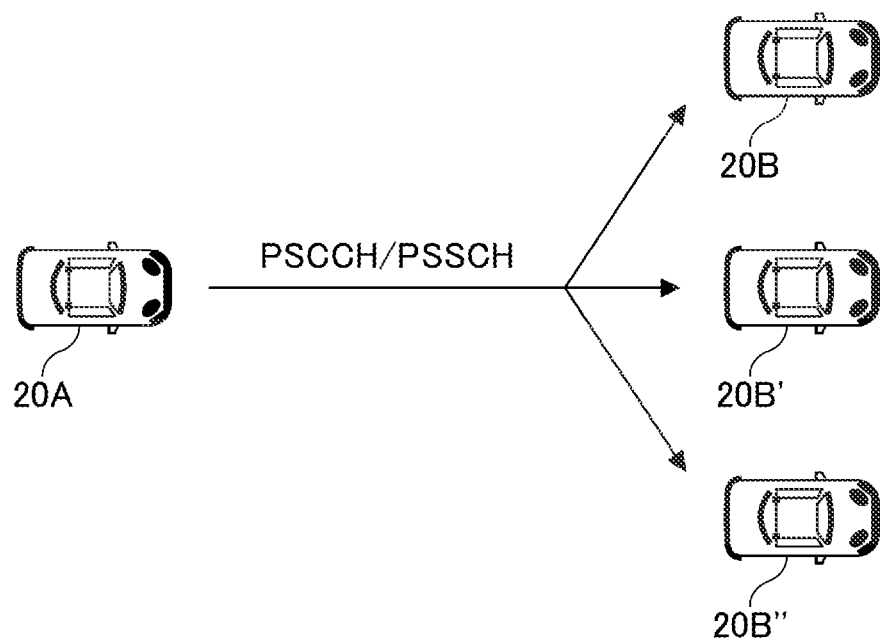
FIG. 9C is a diagram illustrating an example of a broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting terminal 20A to the receiving terminal 20B.

FIG. 9B is a diagram illustrating an example of groupcast PSCCH/PSSCH transmission. A groupcast, for example, refers to a transmission from the transmitting terminal 20A to the terminal 20B and a receiving terminal 20B', which are a group of the receiving terminals 20.

FIG. 9C is a diagram illustrating an example of a broadcast PSCCH/PSSCH transmission. Broadcast refers, for example, to a transmission from the transmitting terminal 20A to the terminal 20B, the terminal 20B', and a terminal 20B" which are all the receiving terminals 20 within a predetermined range.

In New Radio (NR)-Sidelink (SL) of Release 16 of Third Generation Partnership Project (3GPP), feedback of Hybrid Automatic Repeat Request (HARQ) is assumed to be supported.

Figure 10:
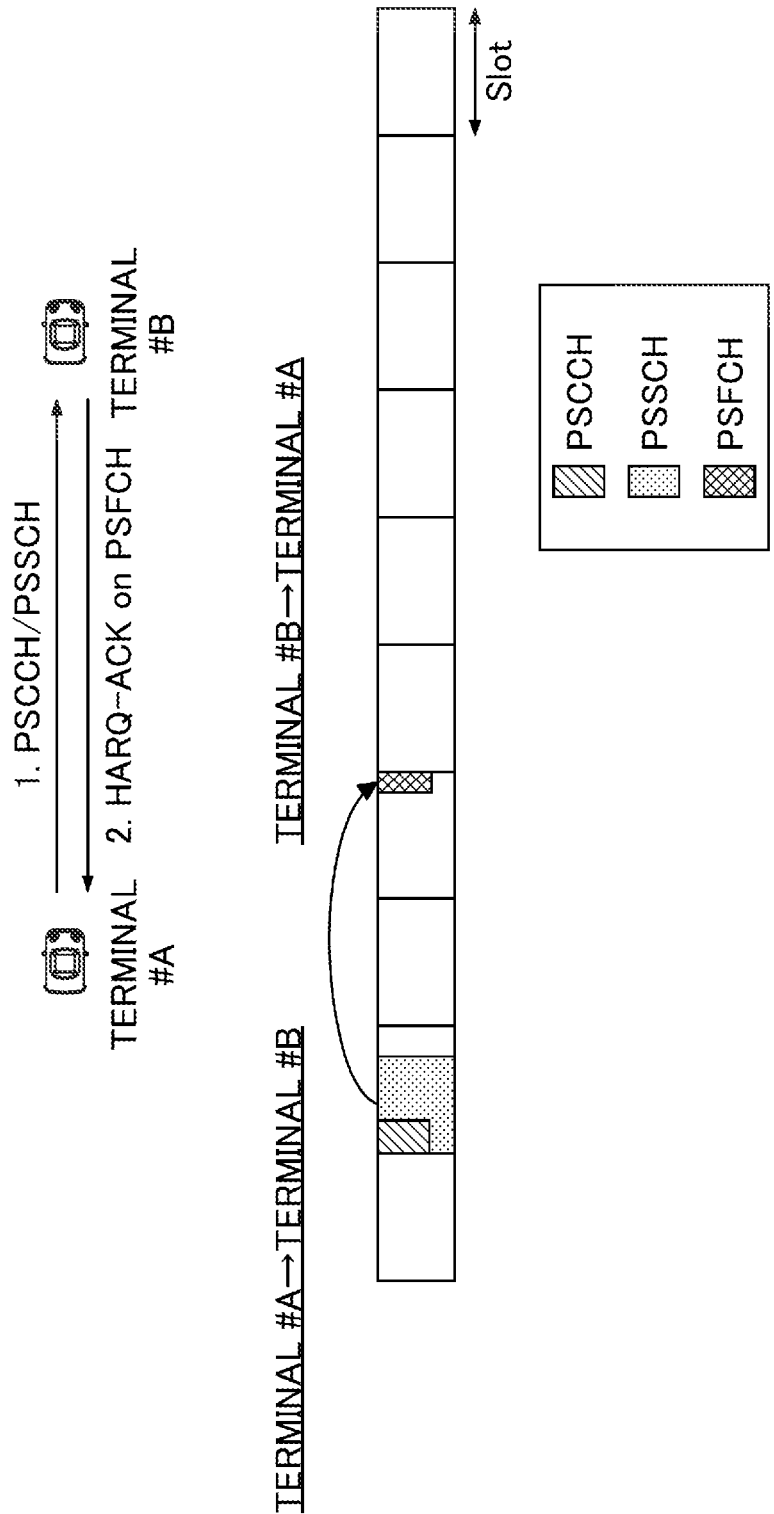
FIG. 10 is a diagram illustrating an example of a mapping in a PSFCH slot.

As illustrated in FIG. 10, a HARQ response signal (HARQ-acknowledgement (ACK)) is transmitted on Physical Sidelink Feedback Channel (PSFCH). In this specification, PSFCH may be referred to as a sidelink feedback channel. Signals transmitted via the PSFCH may be referred to as a sidelink feedback signal and/or a delivery confirmation signal (HARQ-ACK) or the like.

Here, as illustrated in FIG. 10, PSFCH is mapped onto one or more symbols located at the last position(s) in time in a slot, and the PSFCH is transmitted.

A time domain resource of the PSFCH may be associated with a Physical Sidelink Control Channel (PSCCH) and/or a Physical Sidelink Shared Channel (PSSCH). In other words, a time domain resource of the PSFCH is not dynamically indicated by using Sidelink Control Information (SCI) or the like, and as illustrated in FIG. 10, the association between the time domain resource of the PSFCH and the PSCCH and/or the PSSCH may be predetermined.

Figure 11:
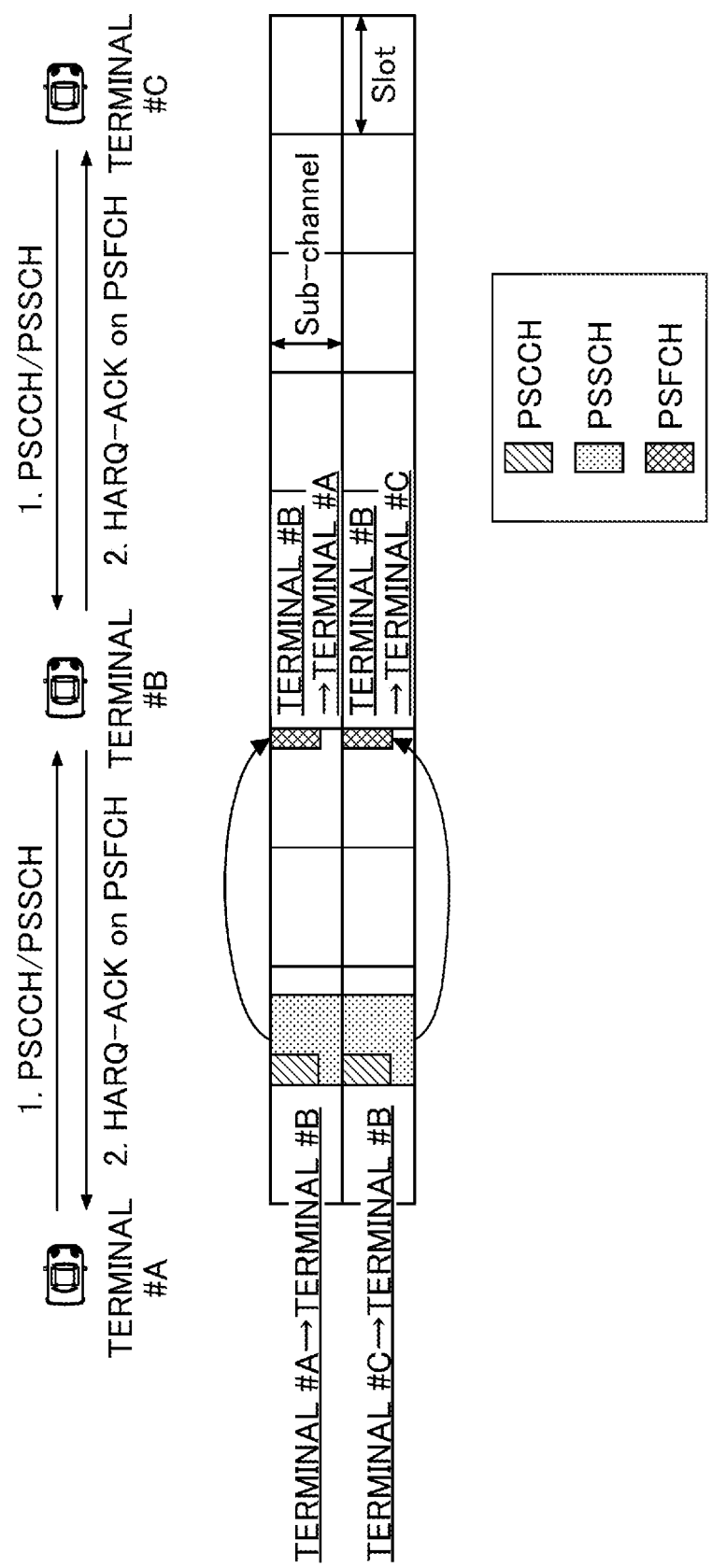
FIG. 11 is a diagram illustrating an example in which a terminal simultaneously transmits a plurality of HARQ-ACKs through a plurality of PSFCHs.

(Problem) A case is assumed in which a terminal simultaneously transmits multiple HARQ-ACKs via multiple PSFCHs. FIG. 11 illustrates an example in which, in response to receiving signals from a terminal #A and a terminal #C via PSCCH/PSSCH, a terminal #B transmits HARQ-ACK to the terminal #A via a PSFCH, and at the same time, transmits HARQ-ACK to the terminal #C via another PSFCH.

As described above, when a terminal is to simultaneously transmit multiple PSFCHs, if multiple resources of the multiple PSFCHs are non-contiguous in a frequency domain, the transmission capability of the terminal may decrease. In a case where multiple resources of multiple PSFCHs are non-contiguous in the frequency domain, the interference on other frequency bands tends to be large, and, thus, it is assumed that a technical specification document defines a large value for Maximum Power Reduction (MPR). Note that the PSFCH may include HARQ-ACK, or may include other information. Here, "simultaneously" as in "simultaneously transmitting multiple PSFCHs" may be any one of (1) multiple PSFCHs are transmitted exactly at the same time, (2) multiple PSFCHs overlap at least in one unit time (for example, one symbol), and (3) multiple PSFCHs are transmitted in the same slot, in the same subframe, or in the same radio frame, but a time when one of PSFCHs is transmitted is earlier than a time when another one of PSFCHs is transmitted.

(Proposal A)

When the number of non-contiguous resources in the time domain of PSFCHs increases, it is assumed that it becomes necessary to set the value of MPR to a larger value, and it is assumed that the transmission capability of a terminal decreases more greatly. Accordingly, in order to prevent reduction in the transmission capability of a terminal, it is considered to limit the number of multiple PSFCHs in a case where the terminal simultaneously transmits multiple PSFCHs. For example, the number of one or multiple PSFCHs to be transmitted simultaneously from a terminal may be defined as X_A.

(A-1)

In a case where a terminal transmits one or multiple PSFCHs, a maximum value X of the number of one or multiple PSFCHs may be defined, (pre)configured, or determined as a UE capability. In this case, X may be one, or alternatively, X may be greater than one. Additionally, X may be transmitted by a higher layer (Radio Resource Control (RRC)) signaling to a base station (gNB/eNB). Additionally or alternatively, X may be transmitted by a higher layer signaling (PC5-RRC) to another terminal. For counting the above-described X_A, multiple PSFCHs including continuous physical resource blocks (PRB) may be regarded as a single PSFCH.

(A-2)

In a case where a terminal simultaneously transmits one or multiple PSFCHs, the number X_A of one or multiple PSFCHs may be limited to be less than or equal to X. Here, if X_A>X is satisfied, the terminal may select X PSFCHs, and the terminal may simultaneously transmit the selected X PSFCHs. Here, the simultaneous transmission of the remaining (X_A-X) PSFCHs need not be performed.

Alternatively, the remaining (X_A-X) PSFCHs may be transmitted at a point in time later than the simultaneous transmission of X PSFCHs.

Option 1: additionally, which of the X_A PSFCHs is to be simultaneously transmitted may depend on the implementation of a terminal.

Option 2: a terminal may simultaneously transmit, among X_A PSFCHs, a PSFCH of a higher priority level and/or a PSFCH with a stricter requirement. Alternatively, a terminal may simultaneously transmit a PSFCH associated with a PSCCH and/or a PSSCH with a higher priority level and/or a PSFCH associated with a PSCCH and/or a PSSCH with a stricter requirement. Here, if, among X_A PSFCHs, multiple PSFCHs or PSCCH and/or PSSCH have the same priority level and/or requirement, X PSFCHs to be simultaneously transmitted may be selected by applying another option to the multiple PSFCHs.

Option 3: X PSFCHs to be simultaneously transmitted may be selected based on a resource in the frequency domain or a resource in a code domain. For example, the terminal may select X PSFCHs having a smaller PRB (PRB index) or a larger PRB (PRB index). For example, the terminal may select X PSFCHs having a smaller subchannel (subchannel index) or a larger subchannel (subchannel index). For example, a terminal may select X PSFCHs associated with a PSCCH and/or a PSSCH having a smaller PRB (PRB index) or a larger PRB (PRB index). For example, a terminal may select X PSFCHs associated with PSCCH and/or PSSCH having a smaller subchannel (subchannel index) or a larger subchannel (subchannel index). For example, a terminal may select X PSFCHs having a smaller cyclic shift index or a larger cyclic shift index. For example, X PSFCHs may be selected by combining some of the above-described examples. If, among X_A PSFCHs, resources in the frequency domain and/or resources in the code domain of multiple PSFCHs are the same, X PSFCHs may be selected by applying another Option to the multiple PSFCHs.

Option 4: a terminal may select which PSFCHs of X_A PSFCHs are to be simultaneously transmitted by prioritizing one or multiple PSFCHs corresponding to PSCCH and/or PSSCH for unicast over one or multiple PSFCHs corresponding to PSCCH and/or PSSCH for groupcast. Alternatively, a terminal may select which PSFCHs of X_A PSFCHs are to be simultaneously transmitted by prioritizing one or multiple PSFCHs corresponding to PSCCH and/or PSSCH for groupcast over one or multiple PSFCHs corresponding to PSCCH and/or PSSCH for unicast. Another Option may be applied to multiple PSCCHs and/or PSSCHs for unicast. Similarly, another Option may be applied to multiple PSCCHs and/or PSSCHs for groupcast.

Option 5: a terminal may select which PSFCHs of X_A PSFCHs are to be simultaneously transmitted by prioritizing a PSFCH corresponding to a PSCCH signal and/or a PSSCH signal received at an earlier timing. Alternatively, a terminal may select which PSFCHs of X_A PSFCHs are to be simultaneously transmitted by prioritizing a PSFCH corresponding to a PSCCH signal and/or a PSSCH signal received at a later timing. Here, if, among X_A PSFCHs, resources in the time domain of the multiple PSFCHs are the same, X PSFCHs may be selected by applying another Option to the multiple PSFCHs.

Option 6: a terminal may randomly select X PSFCHs from X_A PSFCHs.

Figure 12:
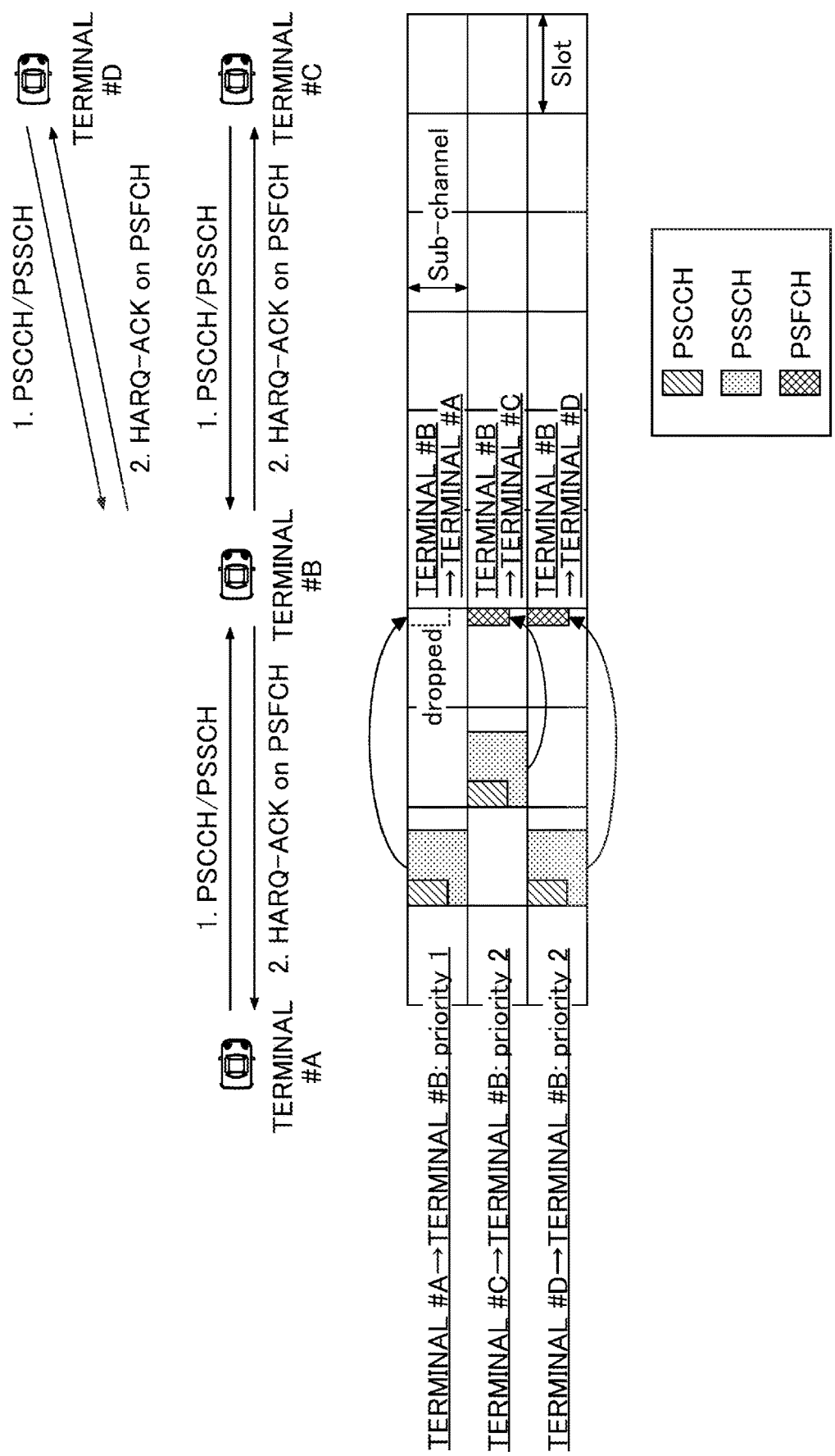
FIG. 12 is a diagram illustrating an example in which simultaneous transmissions of HARQ-ACKs are performed on a PSFCH with a higher priority level.

FIG. 12 is a diagram illustrating an example in a case where X=2 in (A-2) and Option 2 is applied. It is assumed that the degree of priority of transmission from the terminal #A to the terminal #B is 1, and the degree of priority of transmission from the terminal #C to the terminal #B is 2, and the degree of priority of transmission from the terminal #D to the terminal #B is 2. If the degree of priority 2 indicates a priority level higher than the degree of priority 1, the transmission of HARQ-ACK via PSFCH from the terminal #B to the terminal #C and the transmission of HARQ-ACK via PSFCH from the terminal #B to the terminal #D are prioritized. Accordingly, the transmission of HARQ-ACK via PSFCH from the terminal #B to the terminal #A need not be performed. Alternatively, the transmission of HARQ-ACK via PSFCH from the terminal #B to the terminal #A may be performed at a later timing than the transmission of HARQ-ACK via PSFCH from the terminal #B to the terminal #C and the transmission of HARQ-ACK via PSFCH from the terminal #B to the terminal #D.

Figure 13:
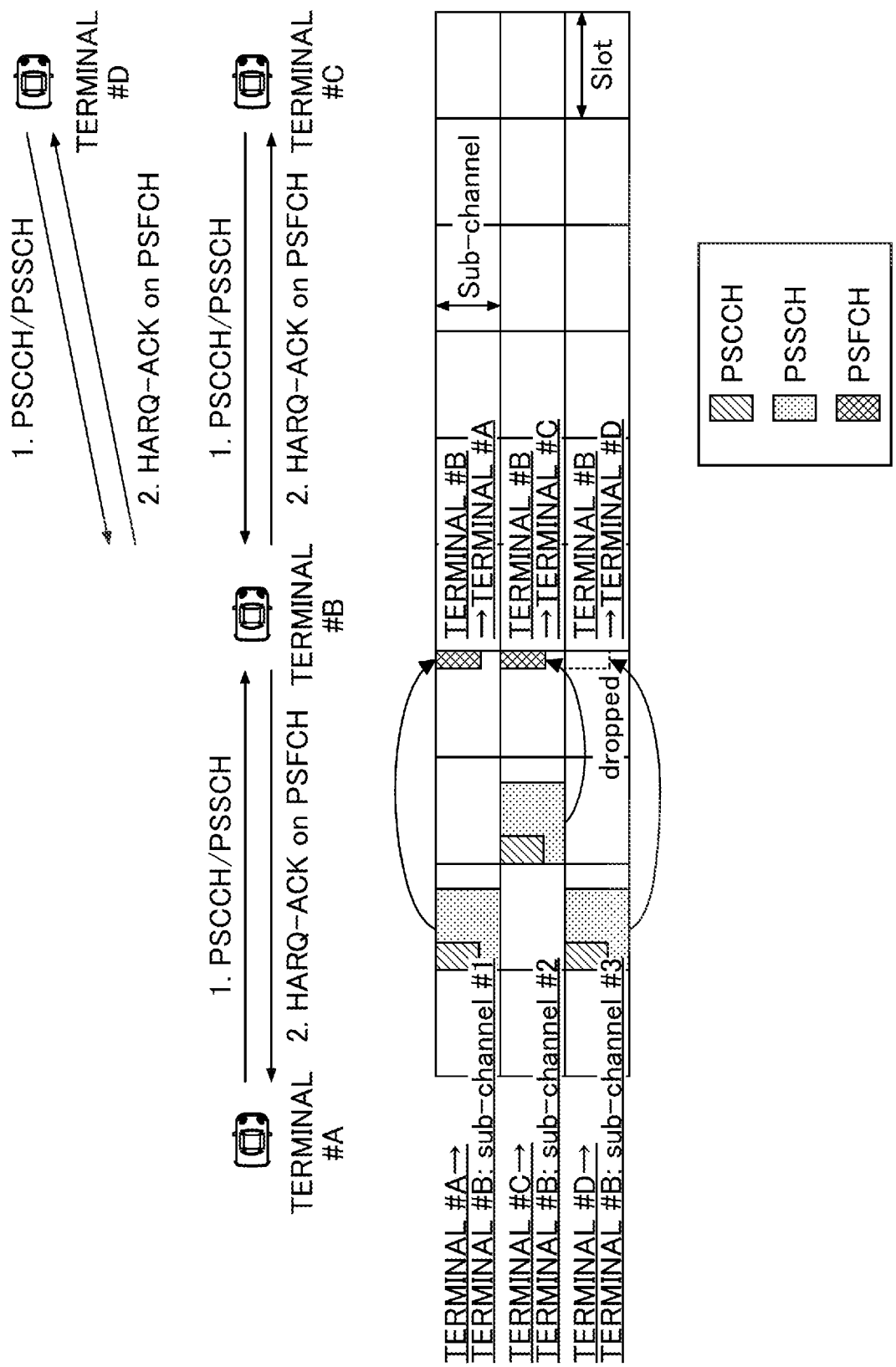
FIG. 13 is a diagram illustrating an example in which simultaneous transmissions of HARQ-ACKs are performed on a PSFCH having a smaller subchannel index.

FIG. 13 is a diagram illustrating an example in which X=2 in (A-2) and one or multiple PSFCHs having smaller subchannel indexes are selected in Option 3. It is assumed that a subchannel index of transmission from the terminal #A to the terminal #B is 1, a subchannel index of transmission from the terminal #C to the terminal #B is 2, and a subchannel index of transmission from the terminal #D to the terminal #B is 3. In this case, the transmission of HARQ-ACK via PSFCH from the terminal #B to the terminal #A and the transmission of HARQ-ACK via PSFCH from the terminal #B to the terminal #C are prioritized. Accordingly, the transmission of HARQ-ACK via PSFCH from the terminal #B to the terminal #D need not be performed. Alternatively, the transmission of HARQ-ACK via PSFCH from the terminal #B to the terminal #D may be performed at a later timing than the transmission of HARQ-ACK via PSFCH from the terminal #B to the terminal #A and the transmission of HARQ-ACK via PSFCH from the terminal #B to the terminal #C.

Figure 14:
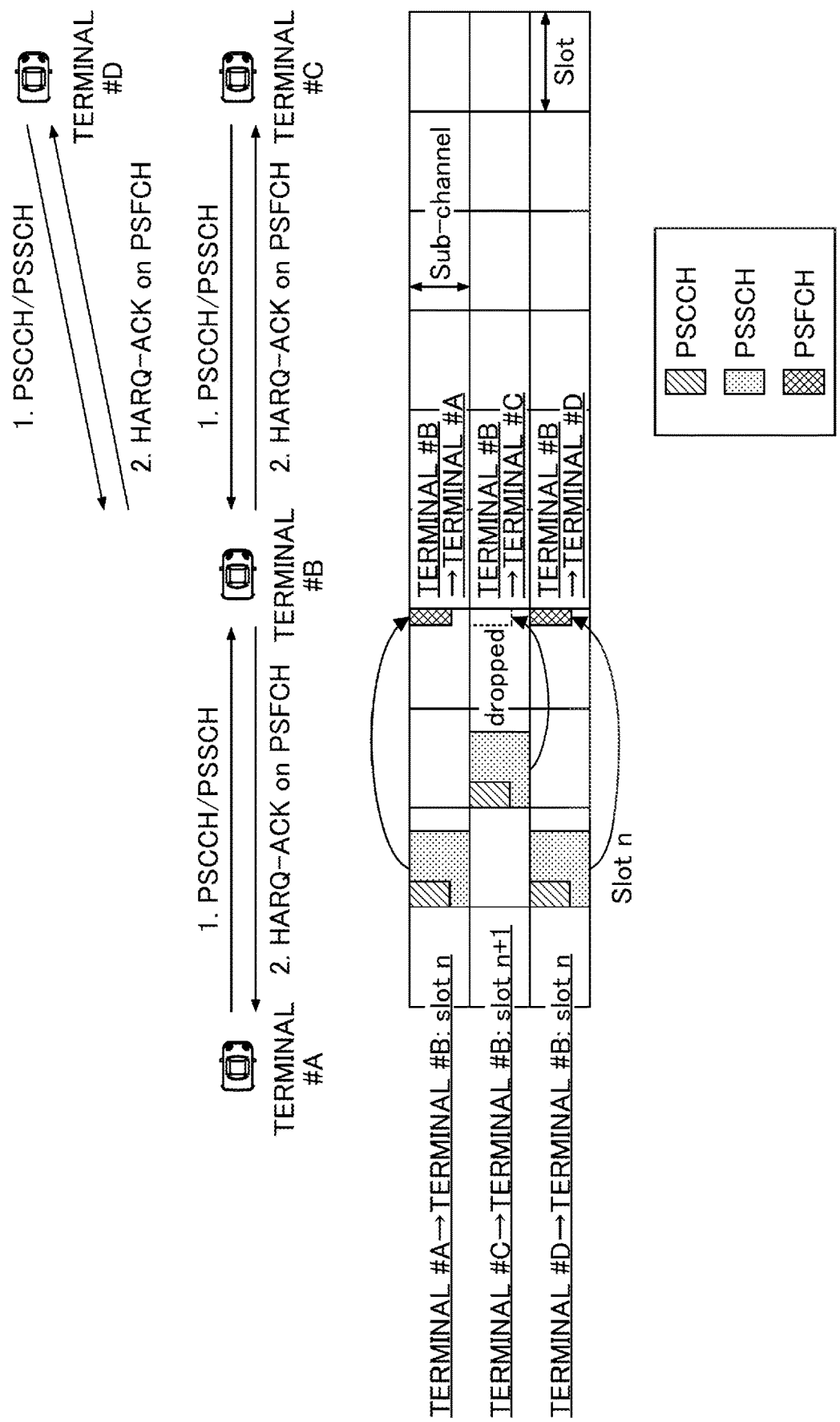
FIG. 14 is a diagram illustrating an example in which a PSFCH corresponding to a PSCCH signal and/or a PSSCH signal received at an earlier timing is prioritized.

FIG. 14 is a diagram illustrating an example in a case where X=2 in (A-2) and a PSFCH corresponding to a PSCCH signal and/or a PSSCH signal received at an earlier timing is prioritized in Option 5. It is assumed that a PSCCH signal and/or a PSSCH signal from the terminal #A to the terminal #B is received in a slot n, and a PSCCH signal and/or a PSSCH signal from the terminal #C to the terminal #B is received in a slot n+1, and a PSCCH signal and/or a PSSCH signal from the terminal #D to the terminal #B is received in the slot n. In this case, the transmission of HARQ-ACK via PSFCH from the terminal #B to the terminal #A and the transmission of HARQ-ACK via PSFCH from the terminal #B to the terminal #D are prioritized. Accordingly, the transmission of HARQ-ACK via PSFCH from the terminal #B to the terminal #C need not be performed. Alternatively, the transmission of HARQ-ACK via PSFCH from the terminal #B to the terminal #C may be performed at a later timing than the transmission of HARQ-ACK via PSFCH from the terminal #B to the terminal #A and the transmission of HARQ-ACK via PSFCH from the terminal #B to the terminal #D.

(A-3)

If the number of one or more PSFCHs is X_A in a case in which the terminal for receiving the PSCCH and/or PSSCH is to simultaneously transmit the one or multiple PSFCHs, a terminal for transmitting PSCCH and/or PSSCH shall transmit a PSCCH signal and/or a PSSCH signal to the receiving terminal, so that it is ensured that X_A is less than or equal to a maximum value X of the number of one or multiple PSFCHs to be simultaneously transmitted.

It should be noted that the number of one or multiple PSFCHs for performing simultaneous transmissions in the Proposal A may be replaced with a difference in frequency domain resources between two PSFCHs (for example, a PRB gap). Reason being, the greater the PRP gap, the greater the possibility that an MPR having a larger value will be applied to transmission of the terminal.

(Proposal B)

In order to suppress a decrease in the capability of transmission by a terminal, a method can be considered in which simultaneous transmissions of HARQ-ACKs via PSFCH are performed by using resources that are continuous, as much as possible, in the frequency domain.

(B-1)

As parameters for determining a resource in the frequency domain and a resource in the code domain of each PSFCH, at least one of the following parameters can be considered.

Figure 15:
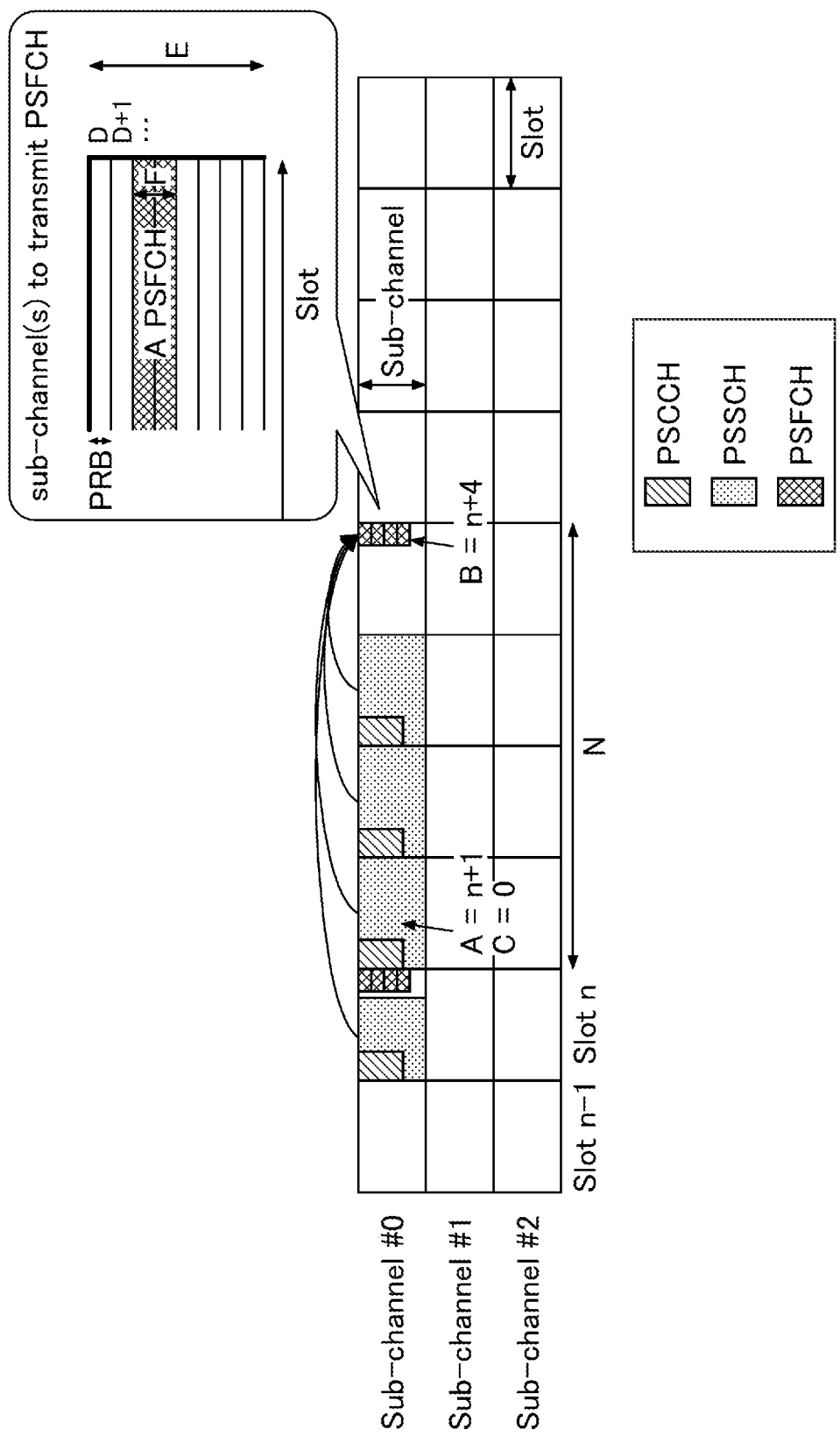
FIG. 15 is a diagram illustrating an example of a parameter for specifying a PSFCH resource.

A: slot index of PSCCH and/or PSSCH
B: slot index of PSFCH
K: a gap between a slot for transmitting PSFCH and the last slot in PSCCH and/or PSCCH
C: subchannel index of PSCCH and/or PSSCH
D: initial PRB index in subchannel for transmitting PSFCH
$D\_m$: initial PRB index in subchannel m
E: the number of PRBs in subchannel transmitting PSFCH
$E\_m$: the number of PRBs in subchannel m
F: the (maximum) number of PRBs of each PSFCH
G: the number of subchannels in a resource pool
H: the number of PRBs in a resource pool
N: periodicity of PSFCH slot
P: L1 source ID
Q: L1 destination ID In FIG. 15, examples of some of these parameters are illustrated.

A method for performing simultaneous transmissions of HARQ-ACKs can be considered in which PSFCH resources that are continuous, as much as possible, are selected in the frequency domain by using these parameters.

(Proposal B-1: Option 1)

Multiple subchannels continuous in the frequency direction for receiving a PSCCH signal and/or a PSSCH signal may be associated with resources of multiple PSFCHs that are continuous in the frequency domain.

Figure 16:
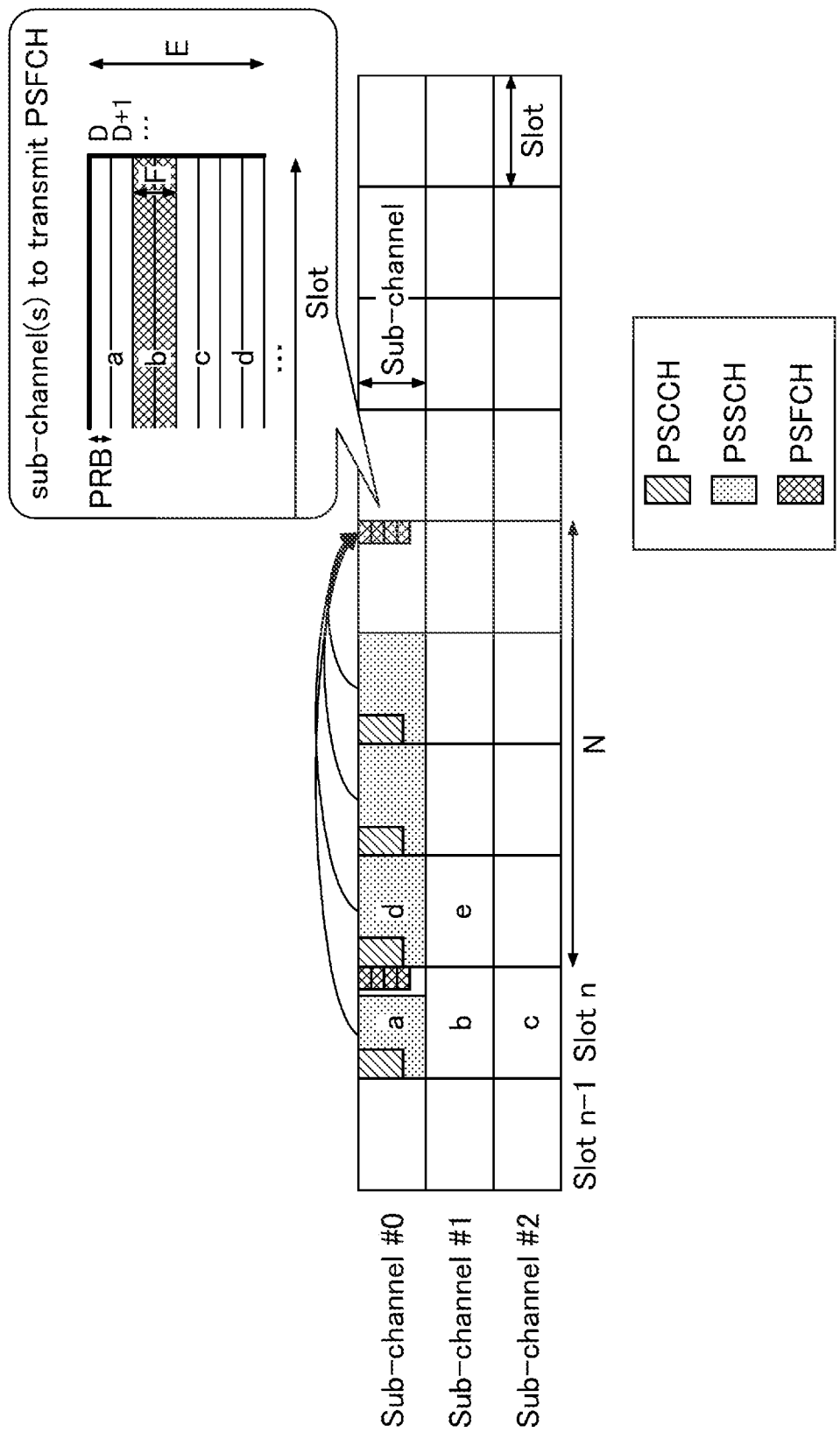
FIG. 16 is a diagram illustrating an example in which multiple subchannels continuous in a frequency direction for receiving a PSCCH signal and/or a PSSCH signal are associated with multiple PSFCH resources continuous in a frequency domain.

For example, in FIG. 16, subchannels in a slot n are ordered as a, b, c, and subchannels in a subsequent slot n+1 are ordered as d, e, . . . . As illustrated in the upper right portion of FIG. 16, PSFCH resources in the frequency domain corresponding to these subchannels may be continuously allocated as a, b, c, d, e, . . . . For example, by receiving signals of PSCCH/PSSCH in continuous subchannels, such as a, b, and c in the slot n, the terminal can transmit the corresponding HARQ-ACKs via PSFCH resources that are continuous in the frequency domain. According to this method, a terminal can transmit signals of multiple PSCCHs/PSSCHs in continuous subchannels, such as a, b, and c in the slot n, and, in response to this, the terminal can receive multiple HARQ-ACKs transmitted via continuous PSFCH resources in the frequency domain.

For example, an initial PRB index, Y, of PSFCH corresponding to PSCCH and/or PSSCH may be determined based on the following expression.

$$Y=D+C\times F+(B-A-K)\times F\times G$$

For example, if $E<F\times G\times N$ is satisfied, i.e., (the number of available PRBs)<(the number of required PRBs) is satisfied, it is necessary to map multiple PSFCH resources onto the same frequency resource. Accordingly, Y may be determined based on the following expression to which a modulo operation is applied.

$$Y=D+(C\times F)\mathrm{mod}(E/N)+(B-A-K)\times F\times (E/N)$$

As described above, in a case where multiple PSFCH resources are mapped onto the same frequency resource, it is necessary to select, in the code domain, multiple different resources corresponding to the multiple PSFCH resources. As such resources in the code domain, for example, a cyclic shift index, $Z=\mathrm{floor}\ (C\times F/(E/N))$ may be used.

(Proposal B-1: Option 2)

Multiple slots continuous in the time direction for receiving a PSCCH signal and/or a PSSCH signal may be associated with multiple PSFCH resources continuous in the frequency domain.

Figure 17:
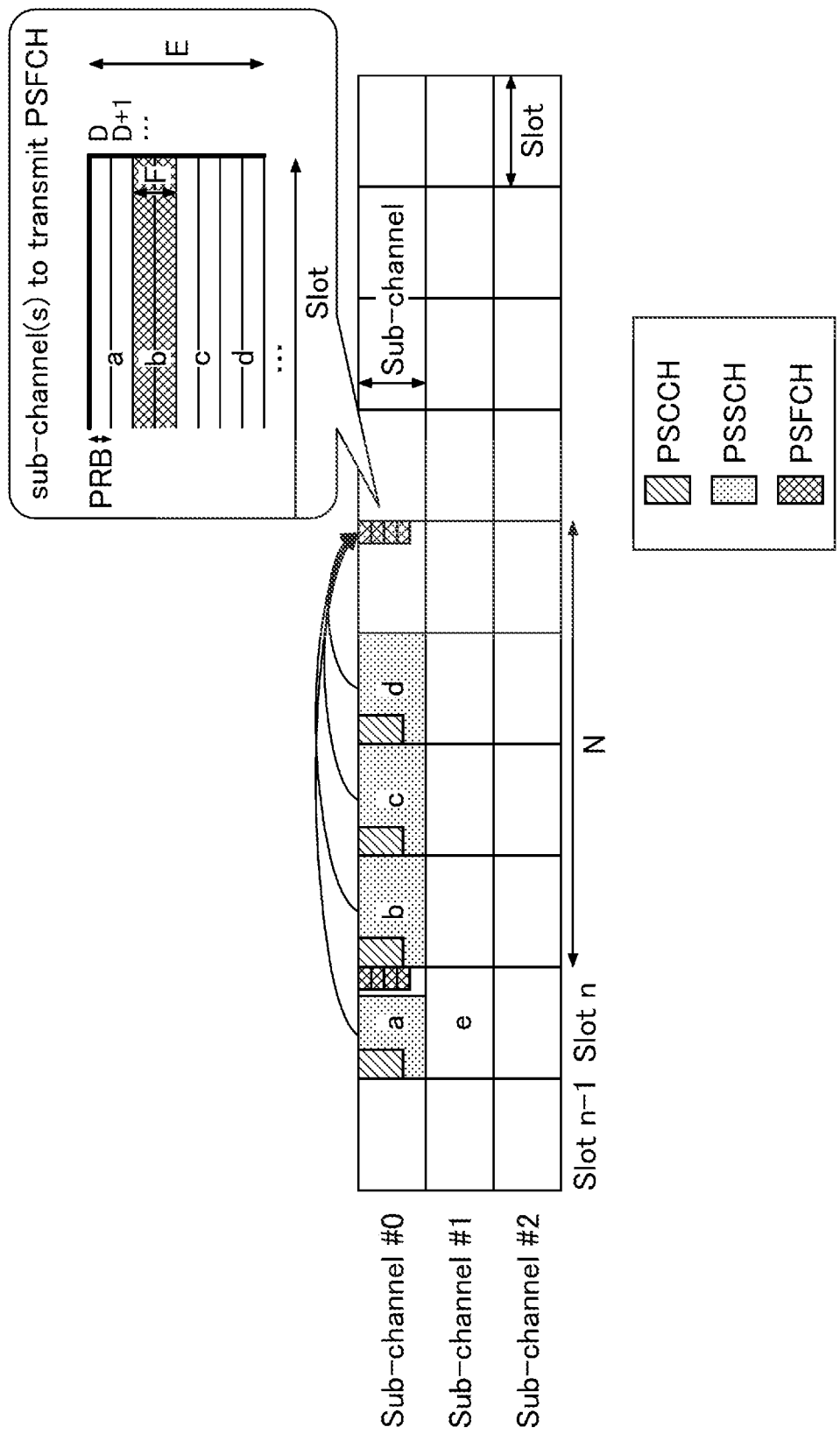
FIG. 17 is a diagram illustrating an example in which multiple slots continuous in a direction of time for receiving a PSCCH signal and/or a PSSCH signal are associated with multiple PSFCH resources continuous in a frequency domain.

For example, in FIG. 17, multiple continuous slots in the subchannel #0 are ordered as a, b, c, and d. As illustrated in the upper right portion of FIG. 17, PSFCH resources in the frequency domain corresponding to these slots may be allocated continuously as a, b, c, and d. According to such method, for example, in the slot a, a terminal transmits data, and another terminal can sense transmission of the data. Accordingly, the another terminal can find which terminal has been determined to transmit a PSCCH signal/a PSSCH signal in the slot a, and based on this, the another terminal can transmit a PSCCH signal/a PSSCH signal in the slot b or c, i.e., the another terminal can transmit data in continuous slots on the same subchannel. Accordingly, multiple HARQ-ACKs for data transmitted from multiple terminals can be transmitted in continuous PSFCHs in the frequency domain.

For example, an initial PRB index, Y, of PSFCH corresponding to PSCCH and/or PSSCH may be determined based on the following expression.

$$Y=D+(B-A-K)\times F+C\times F\times N$$

For example, if $E<F\times G\times N$ is satisfied, i.e., (the number of available PRBs)<(the number of required PRBs) is satisfied, it is necessary to map multiple PSFCH resources onto the same frequency resource. Accordingly, Y may be determined based on the following expression to which the modulo operation is applied.

$$Y=D+((B-A-K)\times F)\mathrm{mod}(E/G)+C\times F\times (E/G)$$

As described above, in a case where multiple PSFCH resources are mapped onto the same frequency resource, it is necessary to select, in the code domain, multiple different resources corresponding to the multiple PSFCH resources. As such resources in the code domain, for example, a cyclic shift index, $Z=\mathrm{floor}\ ((B-A-K)\times F/(E/N))$ may be used.

In the above description, it is assumed that the PSCCH and/or PSSCH and the corresponding PSFCH are transmitted and received in different subchannels. If the PSCCH and/or PSSCH and the corresponding PSFCH are transmitted and received in the same subchannel, Y that is the initial PRB index of PSFCH corresponding to PSCCH and/or PSSCH may be determined based on the following expression.

$$Y=D\_m+(B-A-K)\times F$$

For example, if $E\_m<F\times N$ is satisfied, i.e., (the number of available PRBs)<(the number of required PRBs) is satisfied, it is necessary to map multiple PSFCH resources onto the same frequency resource. Accordingly, Y may be determined based on the following expression to which the modulo operation is applied.

$$Y=D\_m+((B-A-K)\times F)\mathrm{mod}(E\_m)$$

As described above, in a case where multiple PSFCH resources are mapped onto the same frequency resource, it is necessary to select, in the code domain, multiple different resources corresponding to the multiple PSFCH resources. As such resources in the code domain, for example, a cyclic shift index, Z=floor ((B−A−K)×F/(E_m)) may be used.
(Proposal B-1: Option 3)

While using the same frequency domain resources in a resource pool for multiple PSFCHs, mutually different code domain resources may be assigned to the multiple PSFCHs.

For example, Y that is an initial PRB index of PSFCH corresponding to PSCCH and/or PSSCH may be determined based on the following expression.

$$Y=D$$

For example, as a cyclic shift index, Z=(B−A−K)+C×N, or Z=C+(B−A−K)×G may be applied.

Here, in the above Options, a method other than the cyclic shift may be used, as a resource in the code domain. For example, time-domain orthogonal cover code (TD-OCC) or frequency-domain orthogonal cover code (FD-OCC) may be used.

(B-2)

The above B-1 is a method in which the terminal for receiving data selects, as the resources for the multiple PSFCHs, continuous resources, as much as possible, in the frequency domain. In this regard, a method can be considered in which the transmitting terminal transmits a PSCCH signal/a PSSCH signal so that the terminal for receiving data always selects continuous resources in the frequency domain as resources of multiple PSFCHs. For example, as illustrated in FIG. 11, in a case where a terminal #A transmits a PSCCH signal/a PSSCH signal to a terminal #B and thereafter a terminal #C transmits a PSCCH signal/a PSSCH signal to the terminal #B, the terminal #C may select, after considering the transmission from the terminal #A to the terminal #B, resources of PSCCH/PSSCH so that resources of PSFCHs are continuous.

(Proposal C)

The above-described Proposal A and Proposal B may be combined and the combination may be applied.

(Effects)

HARQ-ACKs are transmitted by using resources that are continuous, as much as possible, in the frequency domain as resources of PSFCHs. Accordingly, from the perspective of MPR and the like, the efficiency of PSFCH, i.e., the power can be increased, so that the coverage of PSFCH can be enlarged.

(Device Configuration)

Next, a functional configuration example of each of the base station 10 and the terminal 20 for executing the processes and the operation described so far is described.
<Base Station 10>

Figure 18:
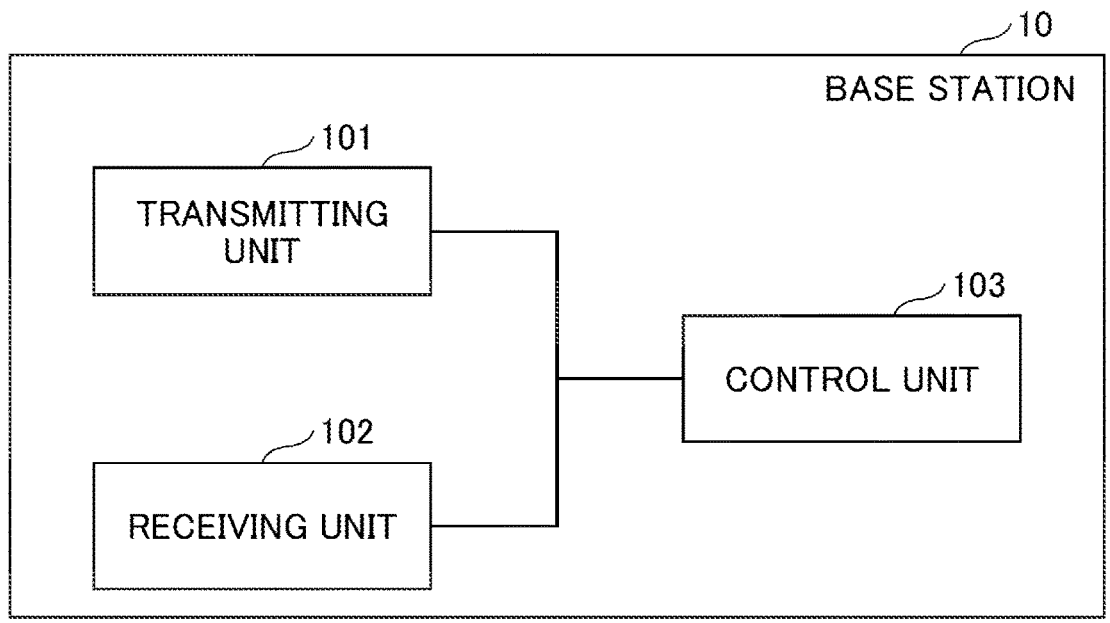
FIG. 18 is a diagram illustrating an example of a functional configuration of a base station according to an embodiment.

FIG. 18 is a diagram illustrating an example of a functional configuration of the base station 10. As illustrated in FIG. 18, the base station 10 includes a transmitting unit 101, a receiving unit 102, and a control unit 103. The functional configuration illustrated in FIG. 18 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the terminal 20 side and transmitting the signal wirelessly. The receiving unit 102 has a function of receiving various types signals transmitted from the terminal 20 and acquiring, for example, information of an upper layer from the received signals. Furthermore, the receiving unit 102 has a function of measuring the received signal and acquiring a quality value.

The control unit 103 controls the base station 10. The function of the control unit 103 related to transmission may be included in the transmitting unit 101, and the function of the control unit 103 related to reception may be included in the receiving unit 102. For example, the receiving unit 102 of the base station receives, as the UE capability, the maximum value X of the number of one or more PSFCHs when the terminal 20 transmits one or more HARQ-ACKs through one or more PSFCHs.
<Terminal 20>

Figure 19:
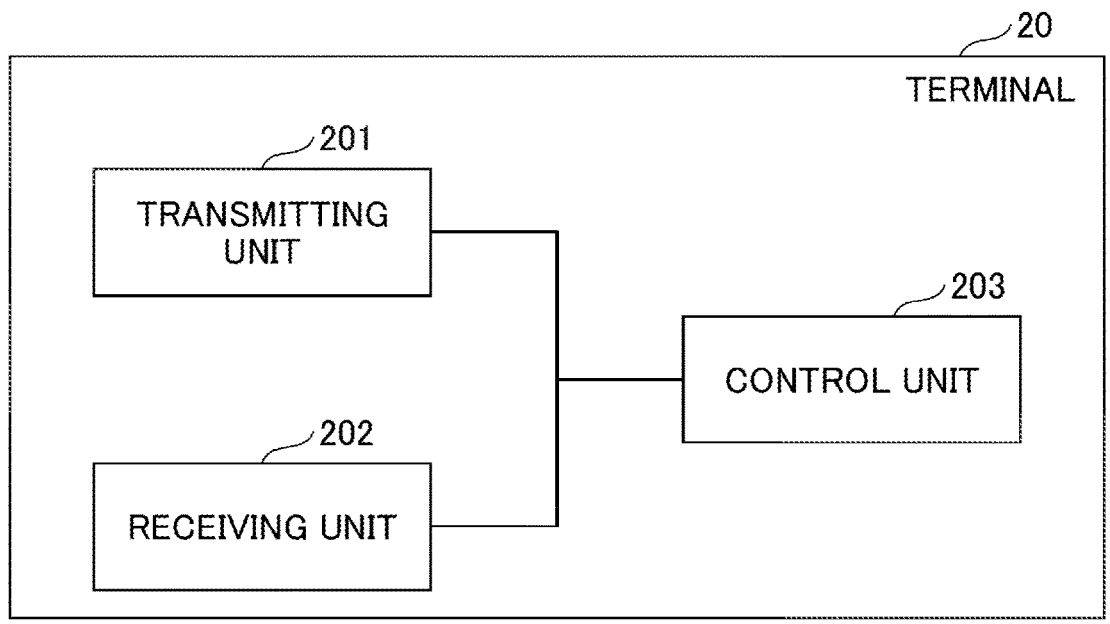
FIG. 19 is a diagram illustrating an example of a functional configuration of a terminal according to an embodiment.

FIG. 19 is a diagram illustrating an example of a functional configuration of the terminal 20. As illustrated in FIG. 19, the terminal 20 includes a transmitting unit 201, a receiving unit 202, and a control unit 203. The functional configuration illustrated in FIG. 19 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the terminal 20 may be the terminal 20A on the transmission side or the terminal 20B on the reception side. Furthermore, the terminal 20 may be a scheduling terminal 20.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The control unit 203 controls the terminal 20. Note that, the function of the control unit 203 related to transmission may be included in the transmitting unit 201, and the function of the control unit 203 related to reception may be included in the receiving unit 202.

The control unit 203 of the terminal 20 may configure, as a UE capability in the terminal 20, the maximum value X of the number of one or multiple PSFCHs in a case where the terminal 20 transmits one or multiple PSFCHs. The transmitting unit 201 of the terminal 20 may indicate the value of X to another terminal 20.

The control unit 203 of the terminal 20 may limit the number X_A of one or multiple PSFCHs to be less than or equal to X in a case where the terminal 20 simultaneously transmit one or multiple PSFCHs. Here, if X_A>X is satisfied, the control unit 203 of the terminal 20 may select X PSFCHs, and the transmitting unit 201 may simultaneously transmit X HARQ-ACKs via the selected X PSFCHs. The control unit 203 of the terminal 20 may determine not to perform simultaneous transmissions of the remaining X_A-X PSFCHs. Alternatively, the control unit 203 may select to perform the simultaneous transmissions of the remaining X_A-X PSFCHs at a later timing than the simultaneous transmission of X PSFCHs.

The control unit 203 of the terminal 20 may select to perform simultaneous transmissions of, among X_A PSFCHs, PSFCHs with higher priority levels and/or PSFCHs with stricter requirements.

In addition, the control unit 203 of the terminal 20 may select one or multiple PSFCHs to be simultaneously transmitted, based on a frequency domain resource or a code domain resource. For example, the control unit 203 of the terminal 20 may select one or multiple PSFCHs having a smaller PRB (PRB index) or a larger PRB (PRB index). For example, the control unit 203 of the terminal 20 may select one or multiple PSFCHs having a smaller subchannel (subchannel index) or a larger subchannel (subchannel index). For example, the control unit 203 of the terminal 20 may select one or multiple PSFCHs associated with PSCCH and/or PSSCH with a smaller PRB (PRB index) or a larger PRB (PRB index). For example, the control unit 203 of the terminal 20 may select one or multiple PSFCHs associated with PSCCH and/or PSSCH having a smaller subchannel (subchannel index) or a larger subchannel (subchannel index). For example, the control unit 203 of the terminal 20 may select one or multiple PSFCHs having a smaller cyclic shift index or a larger cyclic shift index.

The control unit 203 of the terminal 20 may select which PSFCHs of X_A PSFCHs are to be simultaneously transmitted by prioritizing one or multiple PSFCHs corresponding to PSCCH for unicast over one or multiple PSFCHs corresponding to PSCCH for groupcast. Alternatively, the control unit 203 of the terminal 20 may select which PSFCHs of X_A PSFCHs are to be simultaneously transmitted by prioritizing one or multiple PSFCHs corresponding to PSCCH for groupcast over one or multiple PSFCHs corresponding to PSCCH for unicast.

The control unit 203 of the terminal 20 may select which PSFCHs of X_A PSFCHs are to be simultaneously transmitted by prioritizing a PSFCH corresponding to a PSCCH signal and/or a PSSCH signal received at an earlier timing. Alternatively, the control unit 203 of the terminal 20 may select which PSFCHs of X_A PSFCHs are to be simultaneously transmitted by prioritizing a PSFCH corresponding to a PSCCH signal and/or a PSSCH signal received at a later timing.

In addition, the control unit 203 of the terminal 20 may associate multiple subchannels continuous in the frequency direction for receiving a PSCCH signal and/or a PSSCH signal with resources of multiple PSFCHs continuous in the frequency domain.

In addition, the control unit 203 of the terminal 20 may associate multiple slots continuous in the time direction for receiving a PSCCH signal and/or a PSSCH signal with resources of multiple PSFCHs continuous in the frequency domain.

<Hardware Configuration>

The block diagrams (FIG. 18 through FIG. 19) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 20:
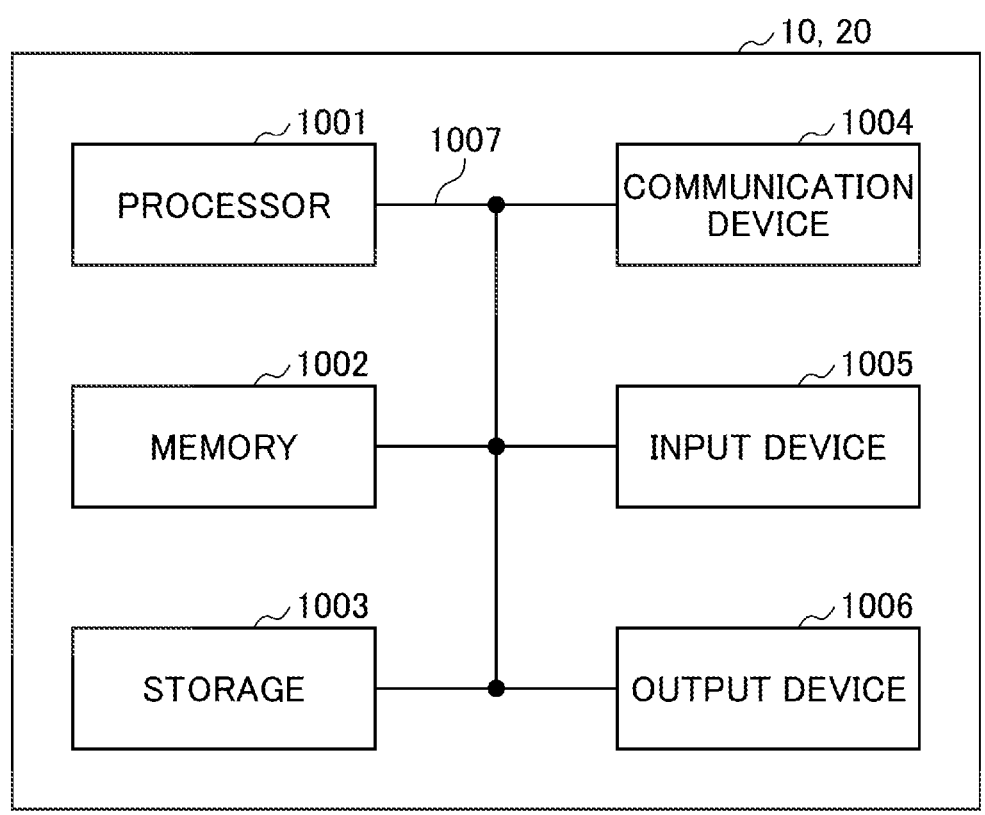
FIG. 20 is a diagram illustrating an example of a hardware configuration of the base station and the terminal according to an embodiment.

For example, the terminal 20 and the base station 10 in an embodiment of the present invention may function as a computer for performing a process of the embodiments. FIG. 20 is a diagram illustrating an example of a hardware configuration of the terminal 20 and the base station 10 according to an embodiment. Each of the terminal 20 and the base station 10 described above may be physically configured as a computer device including a processor 1001, a memory 1002, a storage 1003, a communication device 1004, an input device 1005, an output device 1006, a bus 1007, and the like.

In the following description, the term "device" can be replaced with a circuit, device, unit, or the like. The hardware configuration of each of the terminal 20 and the base station 10 may be configured to include one or more of devices represented by 1001 through 1006, which are depicted, or may be configured without including some devices.

Each function in each of the terminal 20 and the base station 10 is implemented such that predetermined software (program) is read on hardware such as the processor 1001, the memory 1002 and the like, and the processor 1001 performs an operation and controls communication by the communication device 1004 and at least one of reading and writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, data, or the like from at least one of the storage 1003 and the communication device 1004 out to the memory 1002, and executes various types of processes according to them. A program causing a computer to execute at least some of the operations described in the above embodiments is used as the program. For example, the control unit 203 of the terminal 20 may be implemented by a control program which is stored in the memory 1002 and operates on the processor 1001, and another functional block may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 may also be referred to as a "register," a "cache," a "main memory," or the like. The memory 1002 can store programs (program codes), software modules, or the like which are executable for carrying out the radio communication method according to an embodiment of the present disclosure.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database, a server, or any other appropriate medium including at least one of the memory 1002 and the storage 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD).

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected by the bus 1007 to communicate information with each other. The bus 1007 may be configured with a single bus or may be configured with different buses between the devices.

Furthermore, each of the terminal 20 and the base station 10 may be configured to include hardware such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

In this specification, at least the following terminal and communication method are disclosed A terminal including a receiving unit that performs reception on at least one of a plurality of sidelink control channels or a plurality of sidelink shared channels; a control unit that selects, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the feedback channels is associated with at least one of a control channel of the plurality of sidelink control channels or a shared channel of the plurality of sidelink shared channel; and a transmitting unit that performs simultaneous transmissions on the selected upper limit number of sidelink feedback channels.

According to the above-described configuration, when simultaneous transmissions on the plurality of PSFCHs are to be performed from the terminal, by limiting the number of the plurality of PSFCHs, a large value of MPR can be prevented from being applied, and the degradation of the transmission capability of the terminal can be suppressed.

The control unit may select the upper limit number of sidelink feedback channels in a descending order of priority levels assigned to the plurality of sidelink feedback channels.

The control unit may select the upper limit number of sidelink feedback channels based on indexes of resources of the plurality of sidelink feedback channels.

The control unit may set the priority levels assigned to the plurality of sidelink feedback channels based on a timing at which a reception is performed on the at least one of the plurality of sidelink control channels or the plurality of sidelink shared channels.

The control unit may associate, with the plurality of sidelink feedback channels continuous in a frequency domain, a plurality of slots continuous in a direction of time in one subchannel on which reception of the plurality of sidelink control channels or the plurality of sidelink shared channels is performed, and the transmitting unit may perform simultaneous transmissions of the upper limit number of sidelink feedback channels through the upper limit number of sidelink feedback channels continuous in the frequency domain.

A communication method executed by a terminal, the method including performing reception on at least one of a plurality of sidelink control channels or a plurality of sidelink shared channels; selecting, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the feedback channels is associated with at least one of a control channel of the plurality of sidelink control channels or a shared channel of the plurality of sidelink shared channel; and performing simultaneous transmissions on the selected upper limit number of sidelink feedback channels.

According to the above-described configuration, when simultaneous transmissions on the plurality of PSFCHs are to be performed from the terminal, by limiting the number of the plurality of PSFCHs, a large value of MPR can be prevented from being applied, and the degradation of the transmission capability of the terminal can be suppressed.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 20 and the base station 10 are described using the functional block diagrams, but such devices may be implemented by hardware, software, or a combination thereof. Software executed by the processor included in the terminal 20 according to the embodiments of the present invention and software executed by the processor included in the base station 10 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (Boolean: true or false), or may be performed by a comparison of numerical values (for example, a comparison with a predetermined value).

Each aspect/embodiment described in the present disclosure may be used alone, in combination, or may be switched in accordance with the execution. Further, notification of predetermined information (for example, notification of "being X") is not limited to being performed explicitly, but may be performed implicitly (for example, not notifying the predetermined information).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS: Base Station)," "radio base station," "fixed station," "Node B," "eNode B (eNB)," "gNodeB (gNB)," "access point," "transmission point," "reception point," "transmission/reception point," "cell," "sector," "cell group," "carrier,"

"component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," "communication apparatus" and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication apparatus, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a terminal, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of terminals (for example, which may be referred to as device-to-device (D2D) or vehicle-to-everything (V2X)). In this case, the user terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station 10 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

In a case in which "include," "including," and variations thereof are used in the present disclosure, these terms are intended to be comprehensive, similar to a term "provided with (comprising)." Further, the term "or" used in the present disclosure is intended not to be an exclusive OR.

In the present disclosure, for example, when an article such as "a," "an," or "the" in English is added by a translation, the present disclosure may include a case in which a noun following the article is plural.

In the present disclosure, a term "A and B are different" may mean "A and B are different from each other." Furthermore, the term may mean "each of A and B is different from C." Terms such as "separated," "coupled," or the like may also be interpreted similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS 10 base station
20 terminal
101 transmitting unit
102 receiving unit
103 control unit
201 transmitting unit
202 receiving unit
203 control unit
1001 processor
1002 memory
1003 storage
1004 communication device
1005 input device
1006 output device

The invention claimed is:

1. A terminal comprising:
a receiver that performs reception on at least one of a plurality of sidelink control channels or a plurality of sidelink shared channels;
a processor that selects, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the feedback channels is associated with at least one of a control channel of the plurality of sidelink control channels or a shared channel of the plurality of sidelink shared channel; and a transmitter that performs simultaneous transmissions on the selected upper limit number of sidelink feedback channels, wherein the processor associates, with resources of the plurality of sidelink feedback channels continuous in a frequency domain, a plurality of slots continuous in a direction of time in one subchannel on which reception of the plurality of sidelink control channels or the plurality of sidelink shared channels is performed, and wherein the processor determines a maximum number of resources of the plurality of sidelink feedback channels that the terminal can transmit in a slot as UE capability.

2. The terminal according to claim 1, wherein the processor selects the upper limit number of sidelink feedback channels in descending order of priority levels assigned to the plurality of sidelink feedback channels.

3. A communication method executed by a terminal, the method comprising:

performing reception on at least one of a plurality of sidelink control channels and a plurality of sidelink shared channels;

selecting, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the plurality of feedback channels is associated with at least one of a control channel of the plurality of sidelink control channels or a shared channel of the plurality of sidelink shared channels; and performing simultaneous transmissions on the selected upper limit number of sidelink feedback channels, wherein the selecting associates, with resources of the plurality of sidelink feedback channels continuous in a frequency domain, a plurality of slots continuous in a direction of time in one subchannel on which reception of the plurality of sidelink control channels or the plurality of sidelink shared channels is performed, and wherein the terminal determines a maximum number of resources of the plurality of sidelink feedback channels that the terminal can transmit in a slot as UE capability.

4. A communication system comprising:

a terminal including:
 a receiver that performs reception on at least one of a plurality of sidelink control channels or a plurality of sidelink shared channels;
 a processor that selects, upon detecting that a number of a plurality of sidelink feedback channels to be simultaneously transmitted exceeds an upper limit number, the upper limit number of sidelink feedback channels from among the plurality of sidelink feedback channels to be simultaneously transmitted, wherein each of the feedback channels is associated with at least one of a control channel of the plurality of sidelink control channels or a shared channel of the plurality of sidelink shared channel; and
 a transmitter that performs simultaneous transmissions on the selected upper limit number of sidelink feedback channels,
 wherein the processor associates, with resources of the plurality of sidelink feedback channels continuous in a frequency domain, a plurality of slots continuous in a direction of time in one subchannel on which reception of the plurality of sidelink control channels or the plurality of sidelink shared channels is performed, and
 wherein the processor determines a maximum number of resources of the plurality of sidelink feedback channels that the terminal can transmit in a slot as UE capability; and another terminal including:
 a transmitter that performs transmission on at least one of the plurality of sidelink control channels or the plurality of sidelink shared channels; and
 a receiver that performs reception on the sidelink feedback channels.

* * * * *